(12) United States Patent
Evans et al.

(10) Patent No.: US 7,213,026 B2
(45) Date of Patent: May 1, 2007

(54) APPARATUS AND METHOD FOR ASSOCIATING CLASSES

(75) Inventors: Stephen C. Evans, Aylesbury (GB); Karen C. Roles, Send (GB); Michael J. Musgrove, Whitley Bay (GB)

(73) Assignee: Sun Microsystems, Inc., Santa Clara, CA (US)

( * ) Notice: Subject to any disclaimer, the term of this patent is extended or adjusted under 35 U.S.C. 154(b) by 651 days.

(21) Appl. No.: 10/354,458

(22) Filed: Jan. 29, 2003

(65) Prior Publication Data

US 2004/0039745 A1    Feb. 26, 2004

Related U.S. Application Data

(60) Provisional application No. 60/405,649, filed on Aug. 23, 2002.

(51) Int. Cl.
G06F 17/30 (2006.01)

(52) U.S. Cl. .................. 707/101; 707/10; 707/102; 707/103 R; 707/104.1; 709/223; 711/173

(58) Field of Classification Search .............. 707/2, 707/10, 101, 102, 1, 3, 8, 103 R, 104.1; 709/223, 709/224; 715/734, 735; 711/173; 725/58
See application file for complete search history.

(56) References Cited

U.S. PATENT DOCUMENTS

| | | | | |
|---|---|---|---|---|
| 4,961,139 A | * | 10/1990 | Hong et al. ............... 707/1 |
| 5,291,583 A | * | 3/1994 | Bapat .................. 717/137 |
| 5,297,279 A | * | 3/1994 | Bannon et al. ........ 707/103 R |
| 5,437,027 A | * | 7/1995 | Bannon et al. ........ 707/103 R |
| 5,548,749 A | * | 8/1996 | Kroenke et al. ............ 707/102 |
| 5,734,887 A | * | 3/1998 | Kingberg et al. ............. 707/4 |
| 5,787,437 A | * | 7/1998 | Potterveld et al. ...... 707/103 R |
| 5,809,297 A | * | 9/1998 | Kroenke et al. ............ 707/102 |
| 5,819,251 A | * | 10/1998 | Kremer et al. ................. 707/1 |
| 5,857,183 A | * | 1/1999 | Kableshkov .................. 707/3 |
| 5,897,634 A | * | 4/1999 | Attaluri et al. ................ 707/8 |
| 5,987,458 A | * | 11/1999 | Anderson et al. ............. 707/6 |
| 6,046,742 A | * | 4/2000 | Chari ....................... 715/734 |
| 6,182,157 B1 | * | 1/2001 | Schlener et al. ............ 719/318 |
| 6,247,078 B1 | | 6/2001 | Ebert et al. |
| 6,452,809 B1 | | 9/2002 | Jackson et al. |
| 6,556,438 B1 | | 4/2003 | Bolognia et al. |
| 6,564,341 B1 | * | 5/2003 | Sundaram et al. ............ 714/43 |
| 6,583,989 B1 | | 6/2003 | Guyer et al. |
| 6,594,150 B2 | | 7/2003 | Creason et al. |
| 6,631,406 B1 | * | 10/2003 | Pantages et al. ............ 709/223 |
| 6,654,252 B2 | | 11/2003 | Raynham |
| 6,684,222 B1 | * | 1/2004 | Cornelius et al. ........ 707/104.1 |

(Continued)

*Primary Examiner*—Shahid Alam
(74) *Attorney, Agent, or Firm*—Meyertons Hood Kivlin Kowert & Goetzel, P.C.; B. Noel Kivlin

(57) ABSTRACT

A computer-implemented method and mechanism represents system management information for components of a system as instances of managed object classes. A plurality of tables are provided with at least one table including instance entries for instances of physical object classes representing physical entities. Attribute entries for attributes of the physical object classes are mapped to instance entries in the tables. The allocation of attributes to attribute entries can be effected so as to mirror a class inheritance hierarchy. Also, attributes of logical object classes representing logical entities are mapped to the tables to represent associations between the physical object classes and the logical object classes.

29 Claims, 22 Drawing Sheets

U.S. PATENT DOCUMENTS

| | | |
|---|---|---|
| 6,742,068 B2 | 5/2004 | Gallagher et al. |
| 6,807,677 B1 * | 10/2004 | Lee ............................ 725/58 |
| 6,925,546 B2 * | 8/2005 | Krejsa ........................ 711/173 |
| 2002/0124114 A1 | 9/2002 | Bottom et al. |
| 2002/0138782 A1 | 9/2002 | Durrant et al. |
| 2002/0138791 A1 | 9/2002 | Durrant et al. |
| 2003/0069956 A1 * | 4/2003 | Gieseke et al. ............. 709/223 |

* cited by examiner

96 — Entity Physical Table

| Entity Physical Index | Entity Physical Contained In | Entity Physical Class | | | |
|---|---|---|---|---|---|
| 1 | - | Other | ○ | ○ | ○ |
| 3 | 11 | Chassis | ○ | ○ | ○ |
| 5 | 3 | Container | ○ | ○ | ○ |
| 6 | 9 | Power Supply | ○ | ○ | ○ |
| 7 | 3 | Fan | ○ | ○ | ○ |
| 8 | 7 | Sensor | ○ | ○ | ○ |
| 9 | 3 | Module | ○ | ○ | ○ |
| 10 | 3 | Port | ○ | ○ | ○ |
| 11 | 0 | Stack | ○ | ○ | ○ |

| 98 | Entity Logical Table | | | |
|---|---|---|---|---|
| | Index | Description | Type | Context ○ ○ ○ |
| | | | | |
| | | | | |
| | | | | |
| | | | | |
| | | | | |
| | | | | |
| | | | | |
| | | | | |
| | | | | |
| | 114 | 116 | 118 | 120 |

| Entity MIB | | | | | | Platform MIB | | | | | | | | | |
|---|---|---|---|---|---|---|---|---|---|---|---|---|---|---|---|
| Entity MIB Objects | | | | | | Physical | | | | Logical | | | | | |
| Entity Physical Table | | | | | | Platform Equipment Table | Platform Equipment Holder Table | Platform Circuit Pack Table | Platform Physical Table | Platform Sensor Table | Platform Binary Sensor Table | Platform Numeric Sensor Table | Platform Discrete Sensor Table | Platform Discrete Sensor State Table | Platform Fan Table |
| Entity Physical Index | ... | Entity Logical Table | Entity Mapping Table | Entity General Table | Entity MIB Traps | | | | | | | | | | |
| 1 | | | | | | | | | | | | | | | |
| 3 | | | | | | | | | | | | | | | |
| 5 | | | | | | | | | | | | | | | |
| 6 | | | | | | | | | | | | | | | |
| 7 | | | | | | | | | | | | | | | |
| 8 | | | | | | | | | | | | | | | |
| 9 | | | | | | | | | | | | | | | |
| 10 | | | | | | | | | | | | | | | |
| 11 | | | | | | | | | | | | | | | | continued on sheet 19/22

| Platform MIB | | | | | | | | |
|---|---|---|---|---|---|---|---|---|
| Logical | | | | | | | | |
| Platform Alarm Table | Platform Watchdog Table | Platform Power Supply Table | Platform Battery Table | Platform Logical Table | Platform Unitary Computer System Table | Platform Initial Loading Information Table | Platform Start Time | ∘ ∘ ∘ |
| | | | | | | | | |
| | | | | | | | | |
| | | | | | | | | |
| | | | | | | | | |
| | | | | | | | | |
| | | | | | | | | |
| 156 | 158 | 160 | 162 | 164 | 166 | 168 | 170 | 172 |

*FIG. 18 (Continued)*

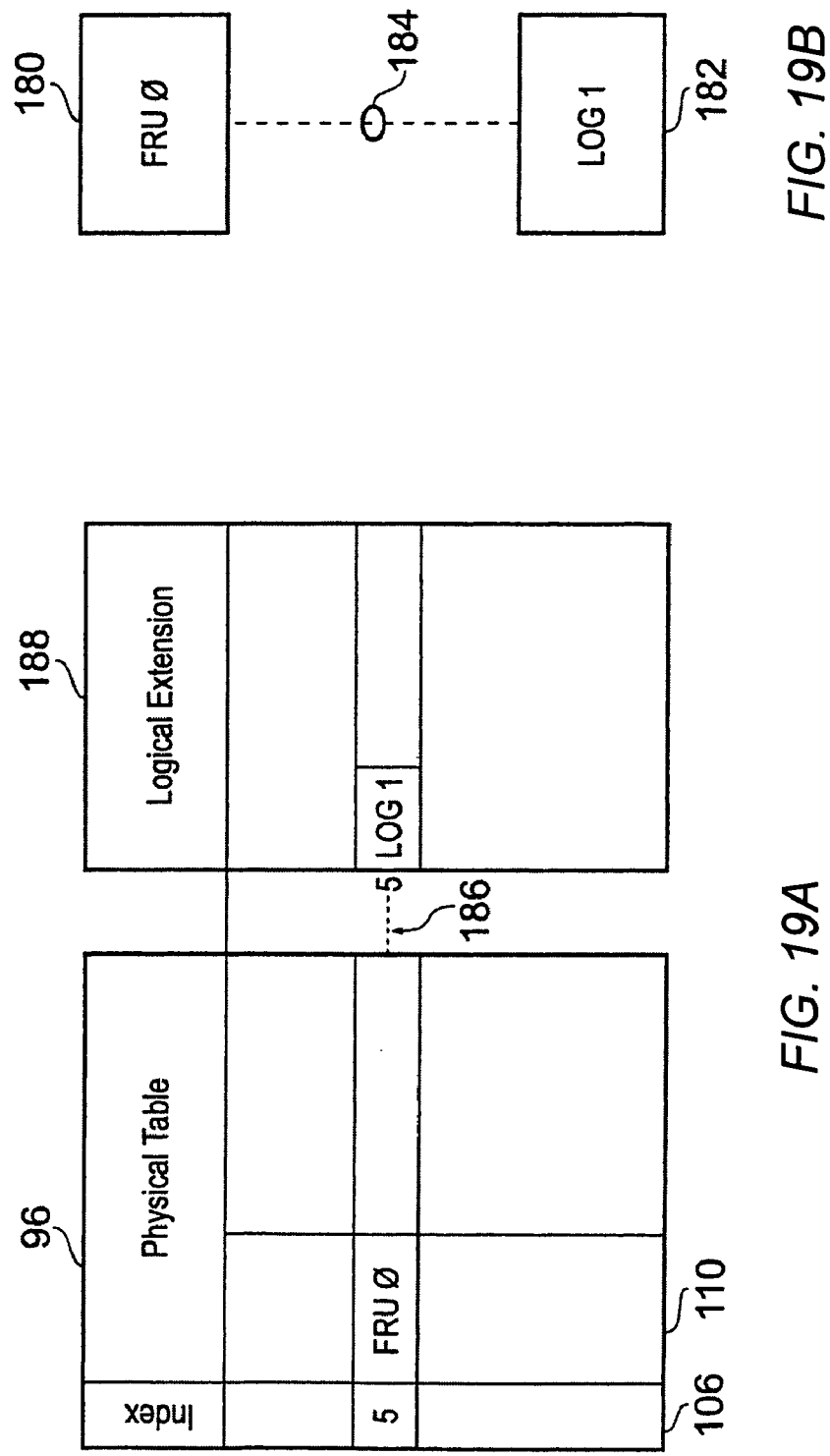

APPARATUS AND METHOD FOR ASSOCIATING CLASSES

This application claims the benefit of U.S. Provisional Application No. 60/405,649 entitled "Apparatus and Method for Associating Classes", filed Aug. 23, 2002.

BACKGROUND OF THE INVENTION

This invention relates to the representation of class associations within a class inheritance hierarchy.

A collection of resources or components within a system can typically be represented as a hierarchy of objects. Such a representation can be helpful for management, for example for remote management of part or all of the system.

The Simple Network Management Protocol (SNMP) provides a means for monitoring and managing systems remotely via a network. More information on SNMP can be found in RFC2576 and RFC2578 from the Internet Engineering Task Force (IETF). Nodes of a system managed under SNMP have an associated SNMP agent that interfaces with a management interface at the node via the SNMP protocol and exposes portions of the node's management interfaces to SNMP managers on the network. The representation of this information is defined in a Management Information Base (MIB) specified using a notation known as the Structure of Management Information, the definition of version 2 of which may also be obtained from the IETF.

The system/devices that are represented by the MIB are viewed as a collection of managed objects, each of which may be said to be of a given object class. The attributes of multiple instances of such a class are generally represented within the MIB using SNMP tables.

The Telecommunications Management Network (TNM) network management model defines a class hierarchy of such managed object classes. However, SNMP does not provide a mechanism for presenting instances of classes from within such an inheritance hierarchy. SNMP tables do not provide a structure whereby the hierarchical relationships can be represented. A consequential disadvantage of this is that the conventional tabular approach of SNMP provides for only limited extensibility, and the structure of the tables is inflexible.

A co-pending U.S. application Ser. No. 09/796,931, filed Feb. 28, 2001, assigned to the present assignee, describes a computer-implemented method and apparatus that can represent system management information for components of the system as instances of object classes within a defined inheritance hierarchy. The class inheritance hierarchy can include multiple levels below an object class including at least a first level below the object class and a second level below the first level. A first level object class at the first level can form an instance of the class and a second level object class at the second level can form an instance at the first level object class. Each instance of an object class can have an attribute with a value representing a characteristic of that instance of the object class. The method and apparatus can involve populating a plurality of tables, the tables being allocated to respective object classes at the multiple levels. The tables can be populated with instance entries for instances of the object classes to which the tables are allocated. The instance entries in the tables can be populated with attribute entries for an attribute of the object classes. The allocation of attributes to the attribute entries can be effected so as to mirror the class inheritance hierarchy. Attributes common to multiple instances of a predetermined object class can be held in the table for that object class. This approach can be applied throughout the object hierarchy. The class can be represented in a Management Information Base (MIB) table with the classes at lower levels in the hierarchy being represented by respective extension tables. The extension tables are typically sparsely populated enabling the representation of the hierarchy with MIB extension tables spread across an appropriate number of MIBs to accommodate the classes required.

Although the method and apparatus described in U.S. Ser. No. 09/796,931 can provide a table-based representation of classes within a defined class inheritance hierarchy that is flexible and extensible, it is directed to the management of a collection of managed objects, each of which relates to a physical entity within that defined class inheritance hierarchy. The remains a need, however, to address, in a flexible and extensible manner, the provision of a management structure that can accommodate logical and physical managed entities, wherein the logical entities may be realized by one or more physical entries.

SUMMARY OF THE INVENTION

An aspect of the invention provides a computer-implemented mechanism that represents system management information for components of a system as instances of managed object classes. The mechanism generates a plurality of tables, wherein at least one table includes instance entries for instances of physical object classes representing physical entities. The mechanism maps attribute entries for attributes of the physical object classes to the instance entries. The allocation of attributes to attribute entries can be effected so as to mirror a class inheritance hierarchy. Attributes of logical object classes representing logical entities are mapped to the tables to represent associations between the physical object classes and the logical object classes.

An embodiment of the invention can thus enable representations between physical entities and logical entities to be represented. A physical entity is one that "obeys the laws of physics". A logical entity is one that provides an abstract representation and possibly an associated service.

A single physical entity that is associated with a plurality of logical entities can be represented by instances of a plurality of logical object class that are each held in a respective one of a plurality of extension tables (in a particular example MIB tables). Each of the plurality of logic entities can be held in a row the respective extension table that corresponds to the row in the table in which the instance of the physical object class with which they are associated is held.

An index can be used to access a row in which an instance of a physical object class is held in the table. Where a single physical entity is associated with a plurality of logical entities, an instance of a logical object class associated with the instance of the object class can be accessible using the index value used to access the instance of the physical object class plus an additional index value, for example an index suffix. A base index can be used to identify an association, and respective index suffixes can be used to identify parties to the association. The "association" can be, for example, an association in which a physical entity realizes a logical entity. A representation of the associations between physical and logical entities can be displayed to a user.

Another aspect of the invention provides a data structure on a carrier medium that represents system management information for components of a system as instances of object classes in a plurality of tables. The tables have instance entries for instances of physical object classes. The instance entries in the tables have attribute entries for attributes of the physical object classes. The allocation of attributes to attribute entries can be effected so as to mirror a class inheritance hierarchy. The tables further represent associations between the physical object classes representing physical entities, and logical object classes representing logical entities.

A further aspect of the invention provides a computer-implemented method of representing management information for components of a system as instances of managed object classes in a plurality of tables, wherein the tables include instance entries for instances of physical object classes representing physical entities. The method includes mapping attribute entries for attributes of the physical object classes to instance entries in the tables, wherein the allocation of attributes to attribute entries can be effected so as to mirror a class inheritance hierarchy. The method further includes mapping attributes of logical object classes representing logical entities to the tables to represent associations between the physical object classes and the logical object classes.

Another aspect of the invention provides a computer system including a mechanism as set out above.

A further aspect of the invention provides a computer system including a data structure as set out above.

Another aspect of the invention provides a computer program comprising program instructions for implementing the mechanism and/or method as described above. The computer program can be provided on a carrier.

Further aspects and advantages of the invention will become apparent from the following description of a preferred embodiment.

BRIEF DESCRIPTION OF THE DRAWINGS

Embodiments of the present invention will be described hereinafter, by way of example only, with reference to the accompanying drawings in which like reference signs relate to like elements and in which:

FIG. 16 represents a physical mapping table;

FIG. 17 represents a logical entity table; and

FIG. 18 represents a platform managed information base table;

FIGS. 19A and 19B illustrate the representation of a 1:1 physical to logical relationship;

Figure 1:
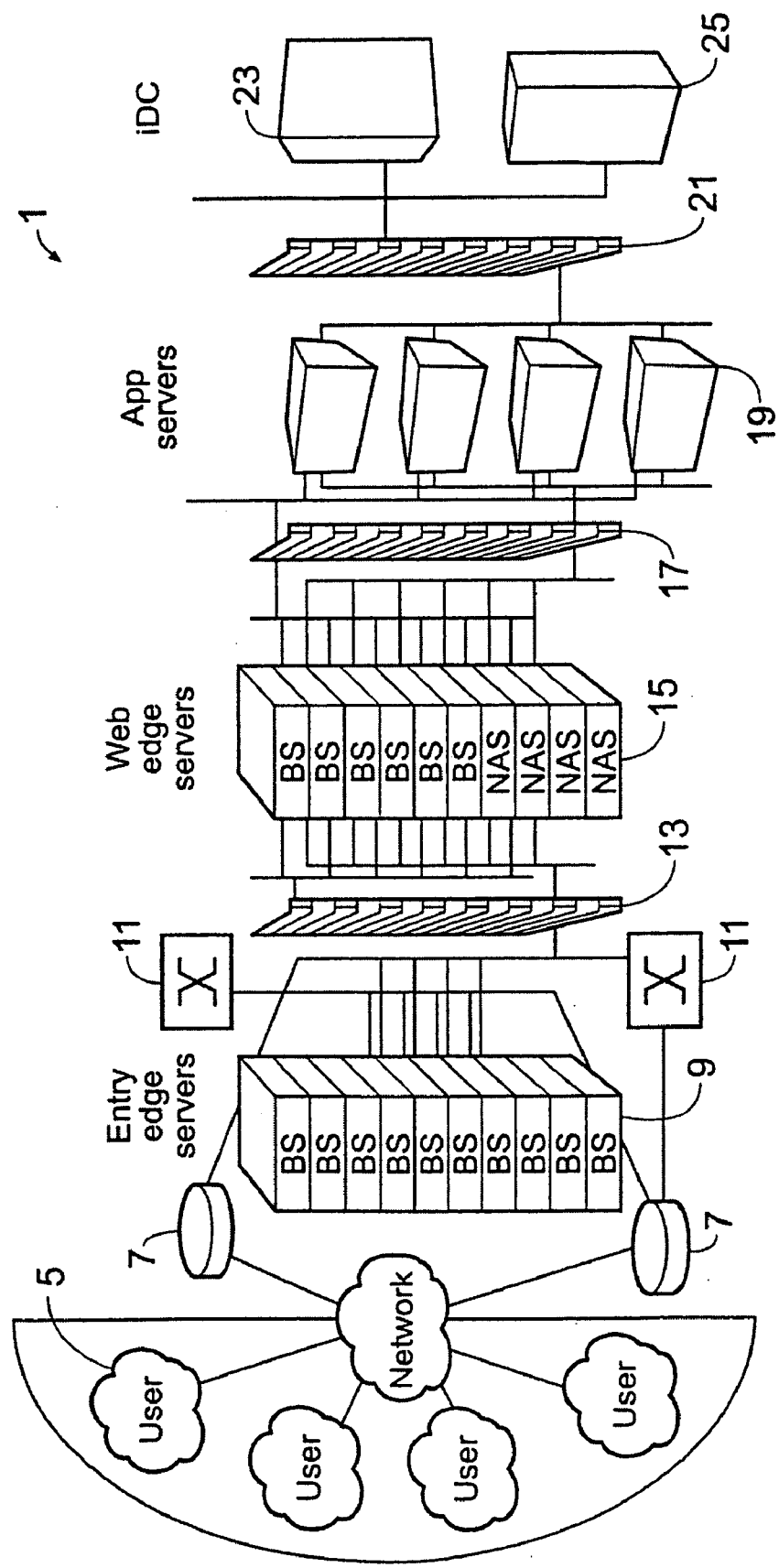
FIG. 1 is a schematic representation of an architecture of a multiprocessor system for supporting a web site.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF PARTICULAR EMBODIMENTS

Embodiments and examples are described hereafter by way of example only in the following with reference to the accompanying drawings.

Shown in FIG. 1 is an example of an application of a high capacity multiserver system 1 for implementing a network-connected web site such as, for example, an airline reservation system on the World Wide Web.

As shown in FIG. 1, an external network 3 (e.g., the Internet) for communicating with a user 5 can be connected to gateways 7 which can be connected to an entry edge server group 9 implemented by a web farm as shown in FIG. 1. The entry edge server group 9 forms an interface to the external network 3. The entry edge server group 9 can then be connected by switches 11 and a firewall 13 to a web edge server group 15 that can also be implemented as a web farm as shown in FIG. 1. The web edge server group 15 can serve to cache web pages that are readily accessible to users 5 accessing the system 1 from the external network 3, for example for checking flight times, etc. The web edge server group can comprise a number of blade server (BS) shelves and a number of network addressable storage (NAS) shelves for storing critical data. The web edge server group 15 can be further connected by a further firewall 17 to a plurality of application servers 19, which can be responsible for, for example, processing flight reservations. The application servers 19 can then be connected via a further firewall 21 to computer systems 23, 25, for example, e-commerce services including financial services for receiving and processing payment for airline reservations.

As will be appreciated, the server system described above with reference to FIG. 1 is only an example of a possible application for a multiprocessor server system. Multiprocessor server systems have many different applications and the present system is not limited to being applicable for use in only one or a limited number of such applications, rather multiprocessor server systems as described herein are operable for use in many different applications. A non-exhaustive list of such alternative applications includes: e-commerce web server systems; telecommunications network server systems; LAN application and file server systems and remote vehicle control systems.

Figure 2:
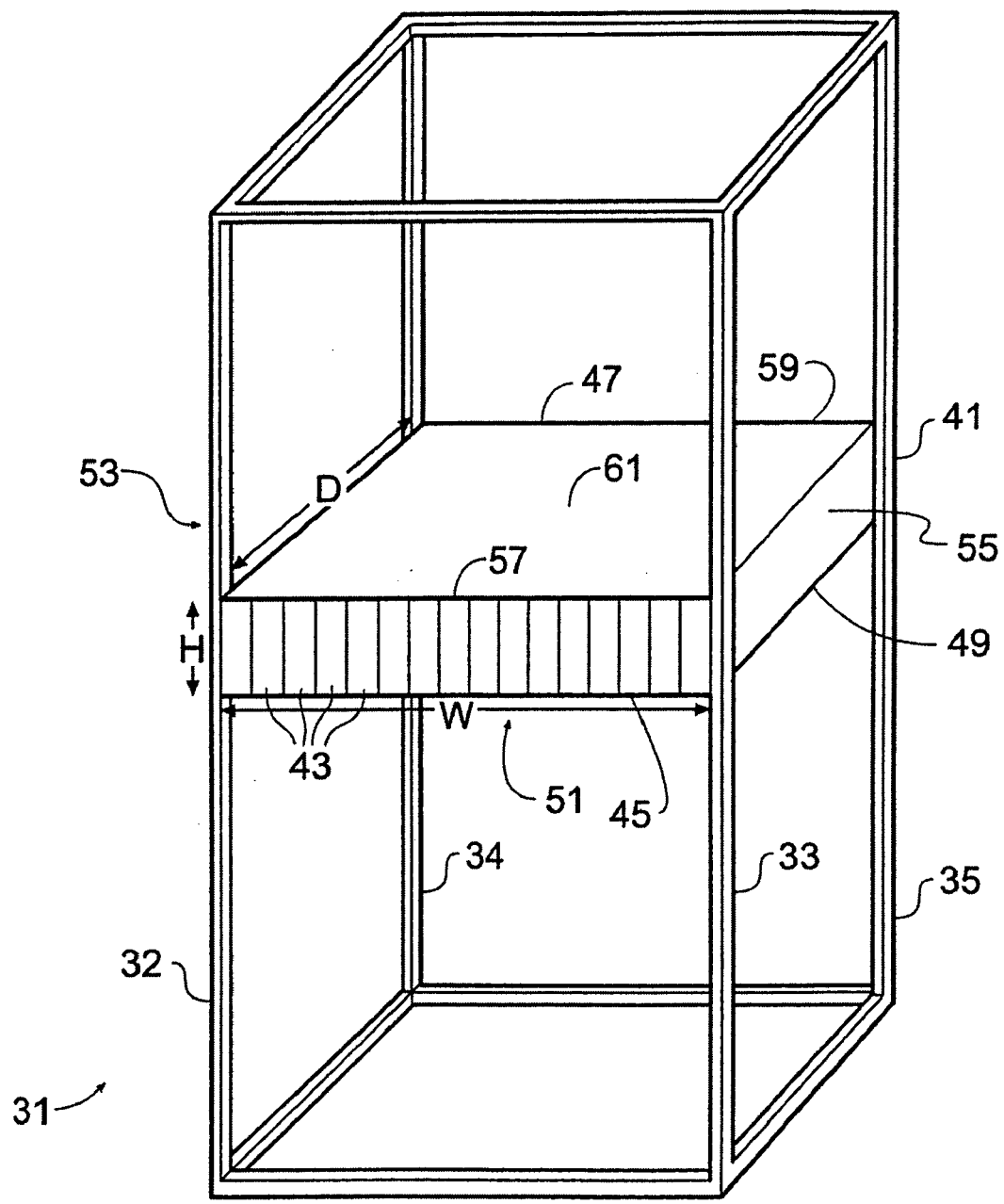
FIG. 2 is a schematic representation of a racking system incorporating an example of a carrier in the form of a rack-mountable shelf according to a first example.

With reference to FIG. 2, there is shown a schematic perspective representation of a rack system 31 as viewed from the front including left and right front uprights 32 and 33 and left and right rear uprights 34 and 35. The uprights can be formed with apertures for receiving shelf fixings (e.g., screws, bolts, clips, etc., for mounting brackets, slides, rails, etc.).

Also shown in FIG. 2 is an example of a blade server shelf 41 mounted in the rack system 31. The shelf 41 forms a carrier configured to carry a plurality of information processing cartridges 43 located side by side along the shelf.

The term "shelf" is used herein in a conventional way to describe a structure that is mountable in rack system 31 and is configured to carry one or more components to form at least a part of a rack-mountable system. In the present example, the shelf 41 is three-dimensional, having a height (H), width (W) and depth (D). In the present example, one dimension (hereinafter described as the height, H) is smaller than the other dimensions (hereinafter described as the depth, D, and the width, W) to facilitate mounting of the shelf within the rack system 31. It will be appreciated that although the width and depth are typically constrained by the dimensions of the racking system for which the shelf is designed, there is more freedom as regard the height, subject to taking account of any appropriate standards and packaging considerations.

Each of the information processing cartridges contains at least one processor. Each information processing cartridge in the present example is operable as a server. In the described examples, the information processing cartridges are configured as robust enclosed modules.

In the present example, the information processing cartridges, when aligned in the carrier shelf, look like rectangular slabs, or blades. Accordingly, an information processing cartridge can be described as a blade. The information processing cartridges 43 comprise information processing modules enclosed in an enclosure, or housing, so that the information processing modules have the form of cartridges. Also, as the information processing cartridges are to operate as computer servers in the example described in more detail presently, an information processing cartridge 43 can also be described as a server blade. Accordingly, in the context of this example, the terms module, cartridge and blade are used interchangeably.

The illustrated example of a shelf 41 is configured to carry sixteen information processing cartridges 43, each of which is removably mountable in a respective opening 45 in the front of the shelf, whereby the information processing cartridges can be inserted into and removed from the front of the shelf 41 without removing the shelf 41 from the rack system 31.

In the present example, the shelf 41 comprises a three-dimensional, generally rectangular, enclosure, or housing, 47 that is suitable for mounting in generic racking systems including both 4-post and 2-post systems. It can be mounted on fixed rigid rack mounting ears and/or a simple slide/support system. The present example is designed for standard 19"-wide racking (1"=25.4 mm) as defined, for example, in the well-known IEC297 and EIA 310 specification standards with height corresponding to the so-called 3U (3 standard unit) height. For mounting such a 3U unit in such a 19"-wide racking system, with a depth of, say 25" or 30", the enclosure can be arranged with a height of up to about 130.5 mm, a width of up to about 445 mm and a depth, including all hardware and fascias, but excluding cable management, of up to about 635 mm, with the depth from the front-most point of a fascia to a rear I/O connector panel of a rear mounted Field Replaceable Unit (FRU) of about 610 mm. Of course, other examples designed for other racking systems could have different dimensions.

This example of a shelf 41 has a single enclosure, or housing, 47 that houses a number of modular units or subsystems, the majority of which are replaceable in the field and are therefore known as Field Replaceable Units (FRUs). These modular units include the information processing cartridges 43.

The shelf enclosure 47 can be fabricated from sheet material (e.g., from steel sheet) to form a chassis portion 49 that includes a base 51, two sides 53 and 55, a front 57 and a rear 59. The word "front" as used here is merely used as a label herein to refer to the face, or wall 57 of the enclosure that is located at the main access side of the rack system 31 in use when the shelf is mounted therein. Similarly, the words "rear" and "side" are merely used as labels herein to refer to the faces, or walls 59, 53 and 55 that, in use, are located at those respective positions when the shelf is mounted in the rack system 31.

The openings 45 can be formed in the front face 57 for receiving the information processing cartridges 43 and, as will be explained later, apertures can also be formed in the rear face 59 for receiving further FRUs. The enclosure can further include a removable top cover 61 that can be secured to the chassis portion 49 by suitable fastening (e.g., screws). The apertures in the front and rear faces 57 and 59 allow at least some of the FRUs to be inserted into and/or removed from the shelf enclosure 47 via the front or the rear thereof, as appropriate, without removing the shelf from the racking. Access to components mounted in the shelf that are not accessible via one of the apertures in the front 47 and rear 59 faces can be achieved by removing the shelf enclosure 47 from the racking system 31 and then removing the top cover 61 of the shelf enclosure 47.

Figure 3:
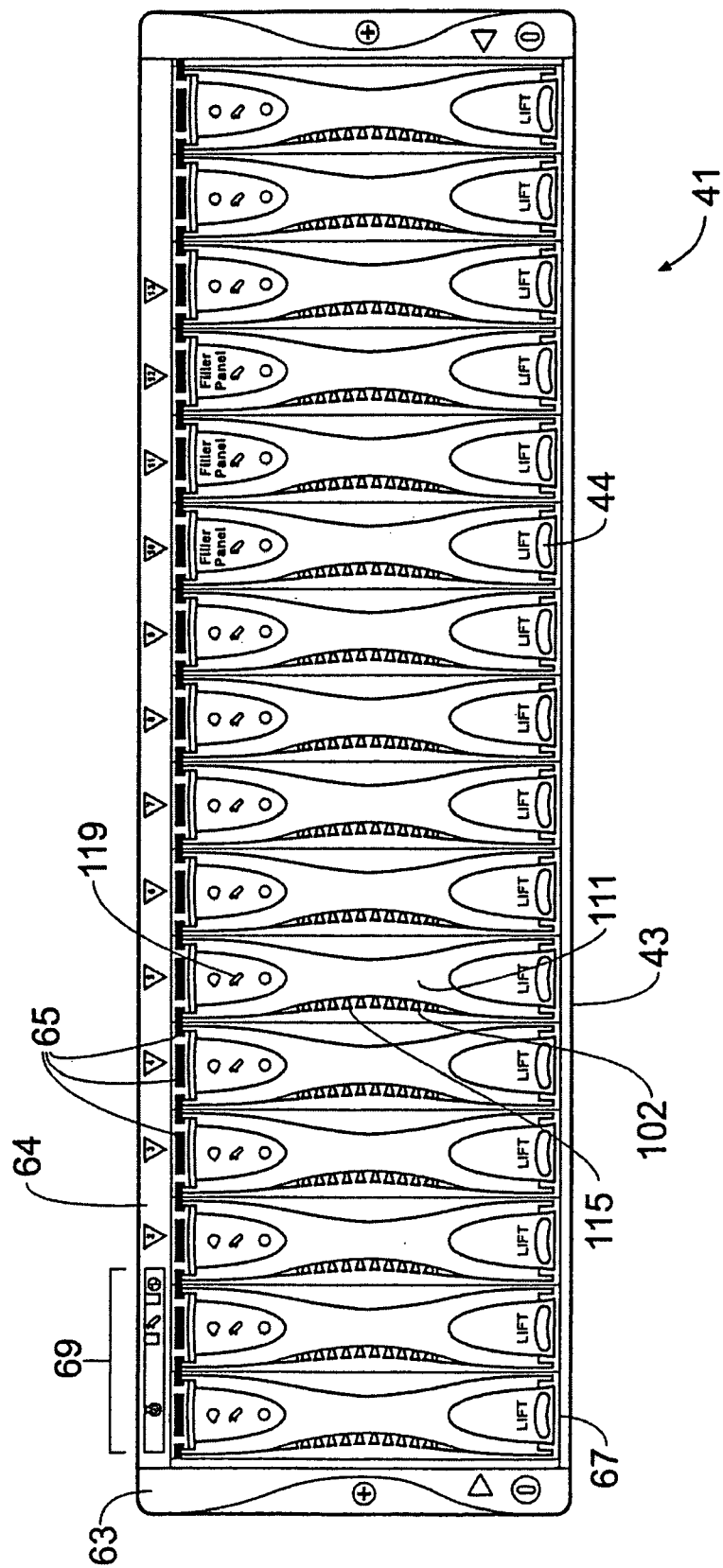
FIG. 3 is a front view of an example of a carrier in the form of a shelf of FIG. 2.

FIG. 3 is a front view of an example of a shelf 41 for a first example. A plastic front bezel 63 can be provided that fits on the front face 57 (shown in FIG. 2) of the chassis 49 of the shelf enclosure 47. The front bezel 63 can be formed as a unitary removable part that spans the whole width and height of the front of the shelf enclosure 47. The front bezel 63 could alternatively include a number of separate components, or mouldings. The front bezel can include a peripheral portion 64 that can provide areas for corporate and product branding marks, for identification and numbering for the information processing cartridge and for a bar code label (all not shown). One or more apertures 65 can be formed in the peripheral portion 64 of the bezel 63. The apertures 65 in the bezel can be arranged to align with one or more apertures (e.g. a slot (not shown in FIG. 3) in the front face of the chassis. In use, air can pass through the apertures 65 to flow into the shelf enclosure 47 to reach FRUs that are mounted in the shelf enclosure 47 through the rear face 59 thereof. Air flowing through the aperture 65 flows into a plenum chamber 66 (not shown in FIG. 3) to flow past the processing cartridges 43 to reach rear mounted FRUs. A central area 67 of the front bezel 63 can be open allowing access to the openings 45 in the front face 57 of the shelf enclosure 47 for insertion and removal of the information processing cartridges 43. Where no active module is mounted in a location for an information processing module, a blanking panel, or filler panel, such as the blanking panel 44, can be located in that location. LED indicators 69 can be mounted on a system indicator printed circuit board (not shown) behind a designated area of the bezel to provide an indication of system status via light guides incorporated into the bezel. A further system indicator board (also not shown) carrying LED indicators can be provided inside the shelf enclosure to be visible from the rear thereof.

As mentioned above, in the present example of a shelf, up to sixteen information processing cartridges 43 can be installed in respective openings 45 in the front face 57 thereof. The number of information processing cartridges 43 actually installed in any installation is dependent upon the system configuration required. Various features relating to the information processing cartridges 43 that are shown in FIG. 3 will be described later.

Figure 4:
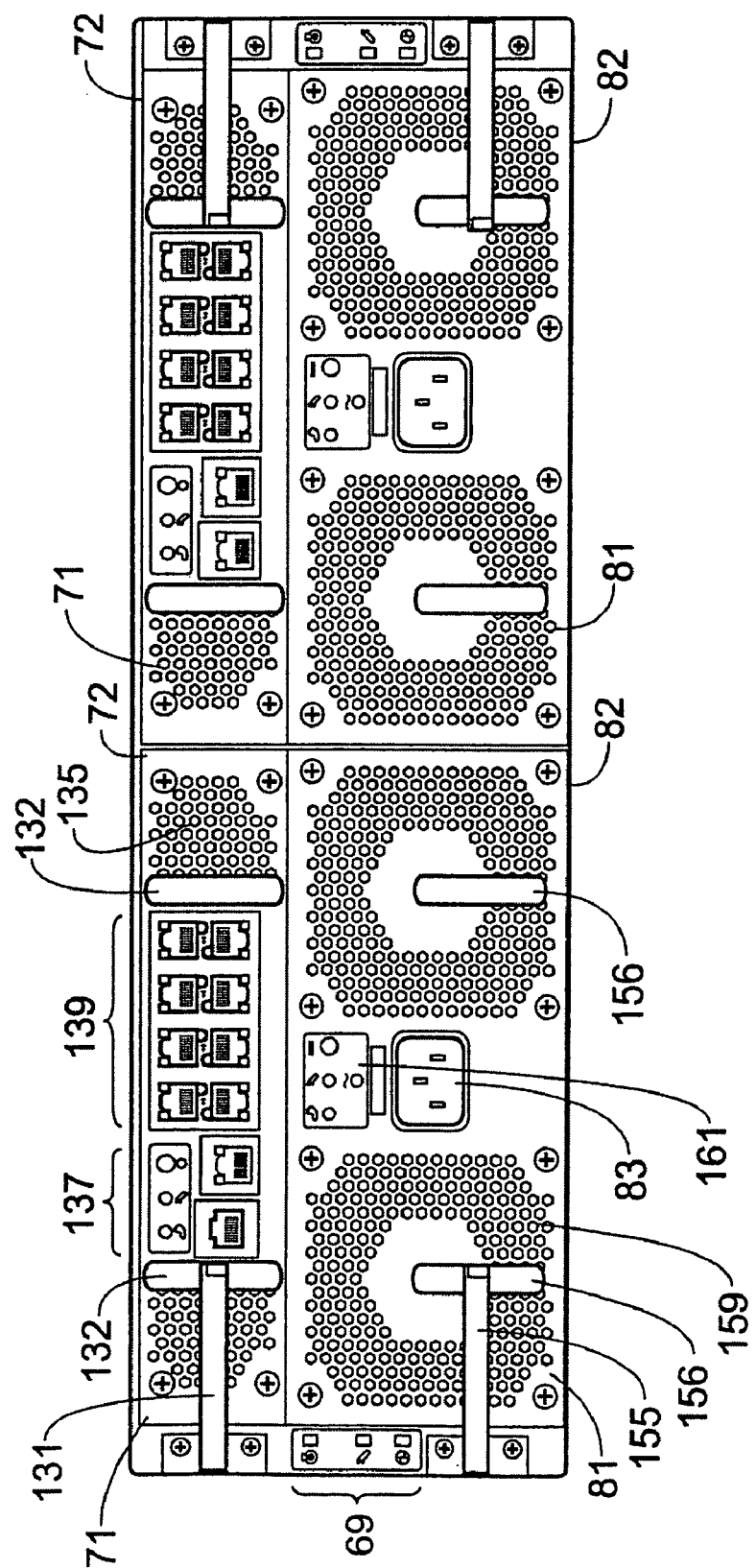
FIG. 4 is a rear view of an example of the shelf of FIG. 2.

FIG. 4 illustrates the rear of the shelf unit of FIGS. 2 and 3. This shows two different types of FRU 71 and 81 (4 units in total) that have been inserted into respective apertures 72 and 82 in the rear of the shelf enclosure 47. The FRUs shown in FIG. 4 include two Combined Switch and Service Processors (CSSPs) 71 and two Power Supply Units (PSUs) 81.

A midplane 171 (not shown) is provided in the shelf enclosure 47 to interconnect the information processing cartridges to the FRUs mounted in the rear of the shelf enclosure 47.

Figure 5:
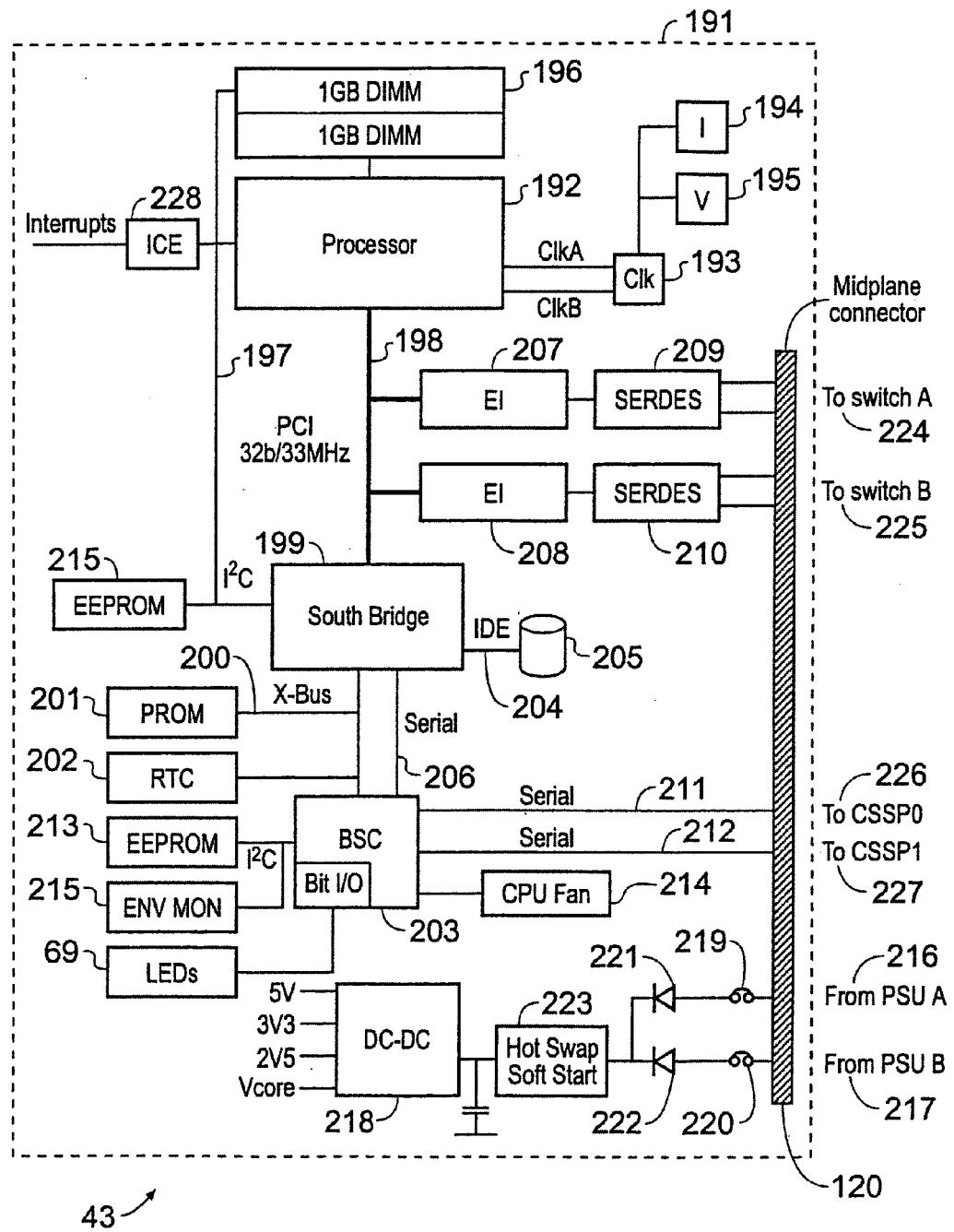
FIG. 5 is a functional block diagram of an example of an information processing subsystem for the information processing cartridge of FIG. 5.

With reference to FIG. 5, there now follows a description of functional elements of an information processing cartridge 43 as contained within the information processing cartridge enclosure 101.

The information processing cartridge 43 includes a microprocessor 192 (a non-limiting example of a microprocessor that can be utilized in the present example is an UltraSPARC™ processor). The microprocessor is mounted on an information processing cartridge motherboard 191.

A configurable clock generator 193, configured as a programmable clock synthesizer employing a crystal, can be used to produce CPU clock signals, CLKA and CLKB. The clock frequency can be determined by jumper settings (not shown). A vectored interrupt controller (I-Chip) 194 and a configurable core voltage regulator module (VRM) 195 are provided.

In the present example, memory means for use by the processor 192 when executing instructions can be provided in the form of buffered dynamic random access memory (DRAM), for example configured as dual in line memory modules (DIMMs) 196 with a 72-bit data path with error correction codes (ECC), seated in two sockets on a riser card from the information processing cartridge motherboard 191. The memory capacity can be chosen to suit the processor addressable memory space. For example, in the present example, up to 4 Gigabytes (4 GB) of addressable memory can be provided. Serial Presence Detect (SPD) auto-configuration is provided via a Service Management Bus (SMBus) over an I2C bus 197.

In the present example, a PCI bus architecture can be employed with a so-called SouthBridge bus bridge 199 with SuperIO and two Gb Ethernet Media Access Control (MAC) devices. As described above, however, other bus protocols (e.g., Infiniband) can be used. A 32 bit PCI bus 198 can be provided from the microprocessor 192. The SouthBridge 199 is a standard form of bus bridge, in the present example packaged in a 352 pin PBGA (Plastic Ball Grid Array) package, that provides the following functions: an SM Bus interface over the I2C bus 197 for access to the SPD (Serial Presence Detect) feature of the DIMMs that allows initialization of the memory controller; an Xbus interface for access via an Xbus 200 (which is a packet switched multiprocessor bus) to a PROM 201, a real time clock (RTC) 202 and an information processing cartridge service controller (hereinafter termed a Blade Service Controller (BSC)) 203; an IDE (Integrated Drive Electronics) interface that provides an ATA-100 (AT Attachment) IDE connection 204 to an IDE disk drive 205; and a serial console interface on a service bus 206 to the BSC 203 that is used for operating system functions including a console function with this embodiment.

For IO to the midplane 171, two AC-coupled Ethernet interfaces 207 and 208 are provided in the present example, which are packaged in a 316 pin PBGA. These Ethernet interfaces can provide a PCI attached Ethernet MAC capable of operation up to Gigabit Ethernet performance. The physical layer can be implemented using SERializer/DESerializers (SERDESs) 209 and 210. An example of a SERDES device is the TLK2201 transceiver manufactured by Texas Instruments, Inc. The SERDES devices use differential PECL TX+/− and RX+/− (Positive Emitter Coupled Logic Transmit and Receive) pairs to communicate to the switch portions of the CSSPs 71 over the midplane 171. The RX+/− pairs can be AC coupled at the information processing cartridge 43, the TX+/− pairs can be AC coupled at each CSSP 71. This facilitates hot-swap of the information processing cartridges 43 and the CSSPs 71.

Asynchronous serial connections 211 and 212 for communication between the BSC 203 and the Service Processor parts of the CSSPs 71 can be provided.

Internal data storage can be provided in the present example by a hard disk 205 with a capacity of 30 GB or more rated for 24/7 continuous operation. The hard disk 205 is accessed using the primary IDE interface of the SouthBridge 199. The hard disk 205 can hold an operating system, for example a Solaris operating system, and other software and data for performing information processing using the main, or host, processor (CPU) within the information processing cartridge 43.

In the present implementation, the BSC 203 can be implemented as a microcontroller (e.g., a Hitachi H8 microcontroller). The BSC 203 can provide various functions, including for example: dual access (for the information processing cartridges and the CSSPs 71) to PROM 201 and EEPROM 213 for boot information and a FRU-ID for the information processing cartridge; channeling communication between an information processing cartridge 43 and the service processor part of the CSSPs 71; control of power on reset (POR), system reset and externally initiated reset (XIR) to the microprocessor 192; control of the power, service-required and ready-to-remove LEDs 69; upgrading of field-upgradable firmware, via the serial interface; a watchdog function for the operating system; monitoring the speed of a CPU fan 214; and communications with an EEPROM 215 and the operating system via the Xbus 200.

In the present example, the BSC 203 can be powered by a 5V service bus (SB) rail as soon as a CSSP 71 and a PSU 81 are fully inserted into the midplane 171, it then turns on other DC/DC converters to provide power to the remainder of the information processing cartridge 43. A BSC reset signal can be derived from a simple conventional power on reset (POR) generator that monitors a 5V supply rail.

In the present example a 1MByte Flash PROM 201 can be provided for storing boot variables for OpenBoot™ PROM (OBP) and Power-On-Self-Test (POST). Further OBP variables can be stored in a second 16 kByte (16 kB) I2C PROM 215, accessible via the SouthBridge SM Bus port over the IC Bus 197. The PROM 215 can contain 8 kByte for OBP variables and 8 kByte of unused space. A 16 kByte I2C EEPROM 213 that is accessible via the BSC 203 can contain BSC variables and FRU-ID variables. The EEPROM is nominally divided into 8 kByte for FRU-ID and 8 kByte for the BSC variables. Write protection for the FRU-ID is implemented by BSC firmware. Such write protection may be carried out by, for example, acknowledging instructions to write to the protected area, but not to carry out those write instructions.

An environmental monitor sensor 215 can be provided to monitor the CPU and ambient temperatures. This sensor can be accessible via the onboard I2C bus from the BSC 203.

The information processing cartridge 43 can be powered from two, diode commoned, 9V power supply rails 216 and 217. DC/DC converters 218 can be used to provide the voltage levels required by the information processing cartridge 43. The DC/DC converters 218 are supplied by dual 9V inputs 216, 217, individually fused 219, 220 and then diode commoned 221, 222. A 5V DC/DC converter can be turned on as soon as the FRU is fully inserted, with the BSC 203 and required portions of the SouthBridge 199 being powered (the 5VSB rail). A field effect transistor (FET) can be used to gate off the main 5V supply to the rest of the information processing cartridge 43. The DC/DC converter outputs and the main 5V FET can be arranged not to turn on until the BSC 203 turns them on via a signal from the SouthBridge 199. The SouthBridge 199 can be used so that if the BSC 203 is reset (by a watchdog timeout or after a firmware download) the state of the DC/DC converters 218 is not affected. When the remaining outputs from the DC/DC converters 218 are within specification, a PWR_GOOD signal can be asserted low to the BSC 203.

A SouthBridge resume circuit can be operable to run from 3V3, and a simple Zener diode dropper circuit can be used to generate 3V3 from the 5VSB supply.

When the FRU is inserted the inrush current can be limited, for example to <1A, and the rate of rise can be configured not to exceed a predetermined value (e.g., 20 A/s) to provide a so-called soft start to facilitate hot-insertion. The intent is to prevent damage to the connectors and to avoid generating noise. A soft start controller 223, which controls a ramping-up of voltage levels, can be enabled when the predetermined signal (Inserted_L signal) is asserted low, this signal is on a short pin in the connector and is connected to ground (GND—not shown) through the midplane 171.

In the present example, a processor impingement fan (processor fan) 214 is configured to run at full speed to cool the information processing cartridge 43 and the fan. The speed of the processor fan and sink can be monitored by the BSC 203, using a tachometer sense pin on the microcontroller. In the event of the fan speed falling below a predetermined speed, or percentage of its nominal speed (e.g., 80%), the BSC 203 can be arranged to issue an alert. The nominal speed of the fan can be recorded as part of the BSC EEPROM contents.

The midplane connector 120 for the information processing cartridge 43 is used to establish the connection between the information processing cartridge 43 and the midplane. In the present example it supports up to 84 connections (pins) that will deliver SERDES outputs 224, 225, I2C signals 226, 227, and power 216, 217. Signal connections may be made through a right-angled connector. Power connections may be made through the information processing cartridge right-angled connector. The connector can be configured to facilitate hotswapping of the information processing cartridge, for example by having a low insertion force and/or guide pins to increase the ease of serviceability and prevent module misalignment during insertion.

Interrupts to the processor 192 can be encoded using an encoded interrupt vector mechanism. An I-Chip Emulator (ICE) 228 functions as an interrupt concentrator, receiving all system interrupts and encoding them as an interrupt vector according to an interrupt vector code utilizable by the processor 192. In the present example, where an UltraSPARC™ processor is used, the interrupt vector encoding may be based on a 6-bit interrupt vector code.

Figure 6:
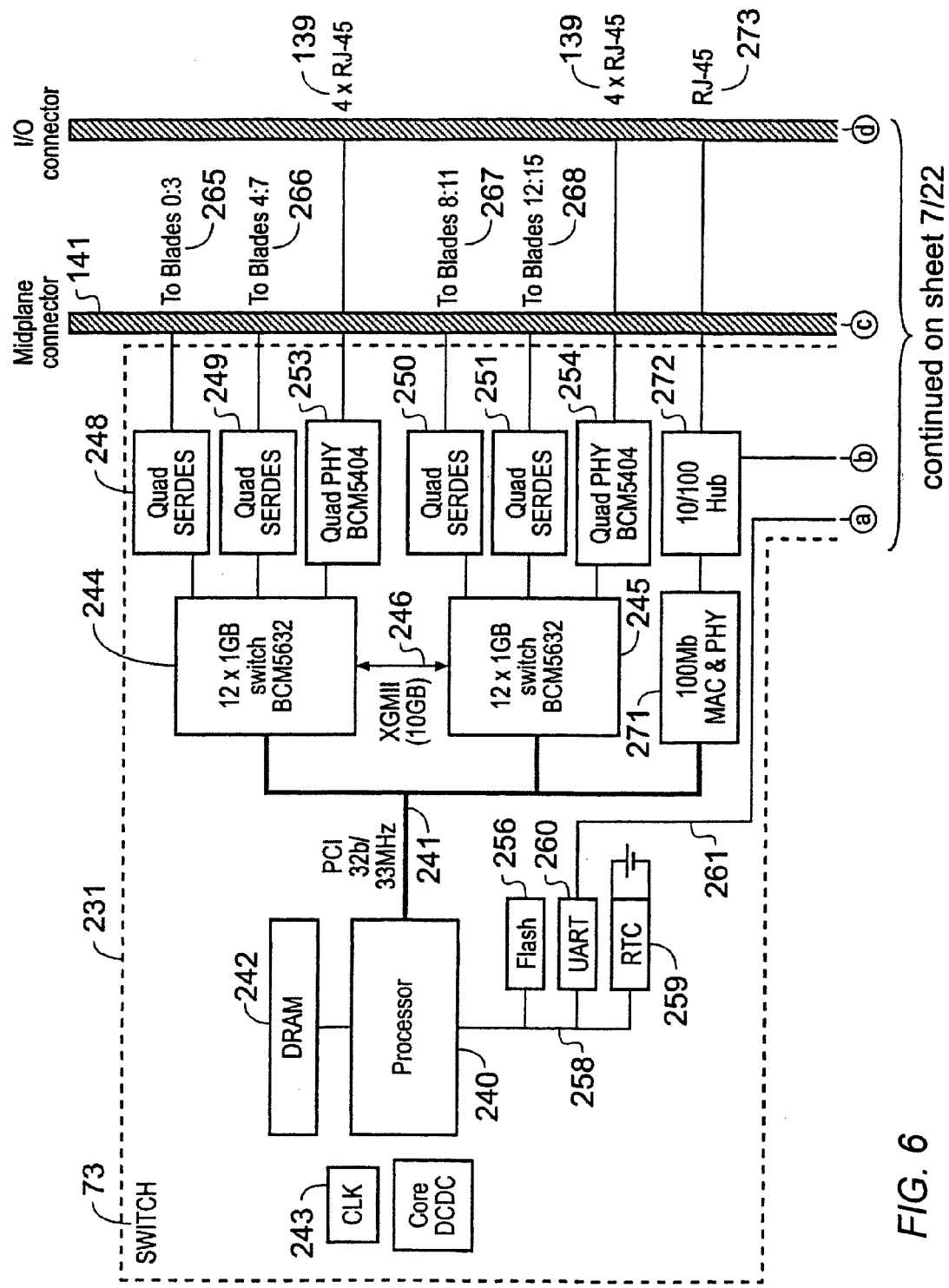
FIG. 6 is a functional block diagram of an example of an information processing subsystem for the combined switch and service processor module of FIG. 6.
Figure 6:
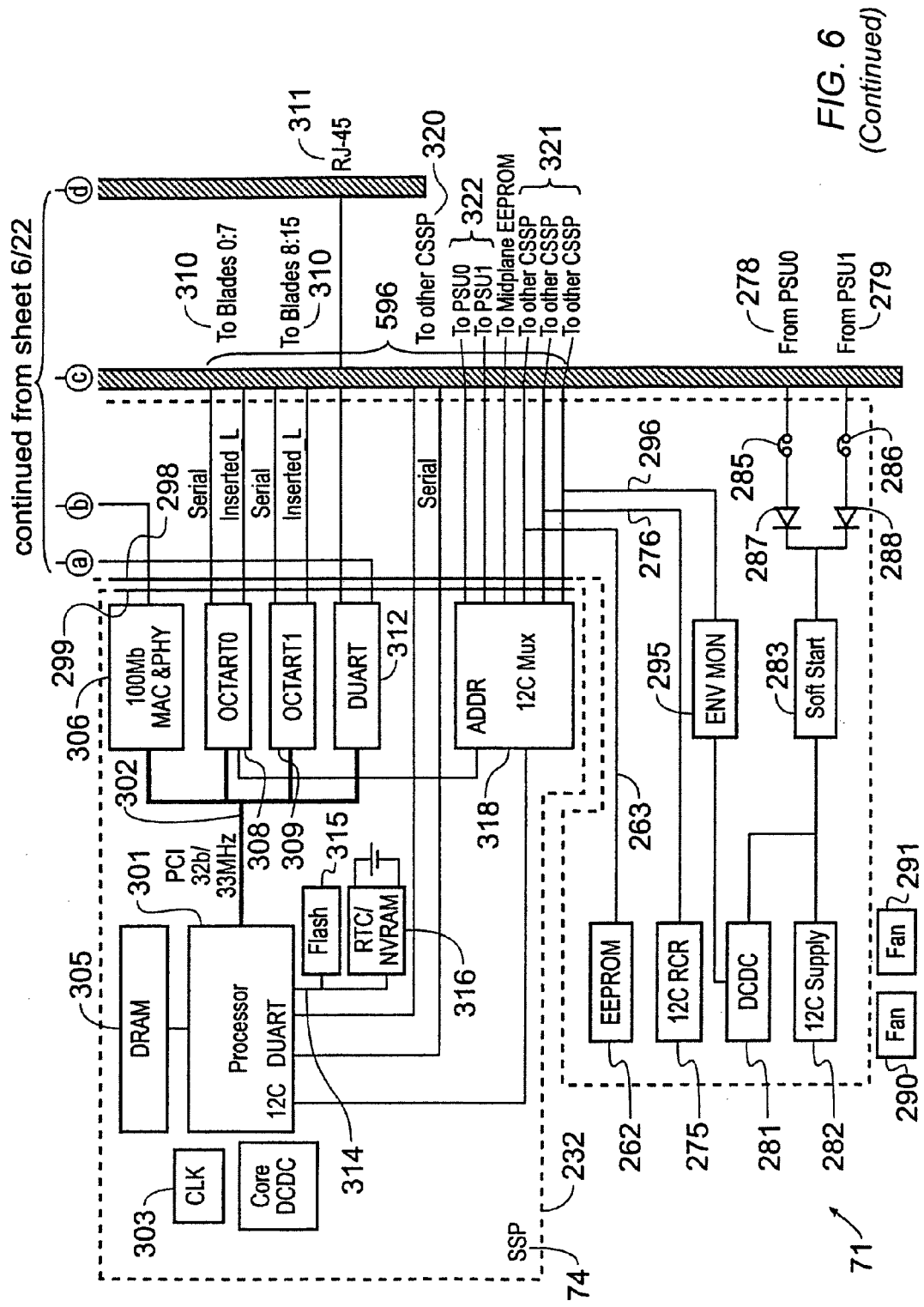

With reference to FIG. 6, there now follows a description of an example of a combined switch and service processor (CSSP) 71. In the present example, each CSSP 71 provides the functionality of a Switch 73 and of a Shelf Service Processor, or Shelf Service Processor (SSP) 74.

FIG. 6 provides an overview of the functional components of the CSSP 71 including functional components of the Switch 73 and functional components of the SSP 74. In the present example, most of the components relating to the Switch 73 are mounted on a Switch PCB 231, and the components relating to the SSP 75 are provided on a SSP PCB 232. However, it should be noted that the components located in the lower portion of the switch PCB 321 (i.e., that portion below the SSP PCB 232 as illustrated in FIG. 6 logically belong to the SSP 74, rather than to the switch 73. It will be appreciated that such component arrangements are not compulsory for successful operation and that any other component arrangement over any number of component boards can be easily achieved using conventional component arrangement techniques.

Firstly, with reference to FIG. 6, there follows a description of functional elements of the Switch portions 73 of a CSSP 71 as contained within the CSSP enclosure 121.

The midplane connector 141 on the CSSP 71 establishes the connection between the CSSP 71 and the midplane 171. In the present example, it supports up to 84 connections (pins) that will deliver SERDES outputs 265–268, I2C signals 310, 320, 321 and 322, and power 278, 279. Signal connections may be made through two 20-pair right-angled connectors. Power connections may be made through a right-angled connector. The connector can be configured to facilitate hotswapping of the board, for example with a low insertion force. The connector also uses guide pins to increase the ease of serviceability and prevent module misalignment during insertion.

A switch microprocessor 240 is provided, in the present example the microprocessor used is a Power PC (MPC8245) packaged in a 352pin Tape Ball Grid Array (TBGA) package. This microprocessor 240 supports between 1 MB and 2 GB of address space in the present example. It further includes an Embedded Programmable Interrupt Controller (EPIC) that provides 5 hardware interrupts (IRQs) or 16 serial interrupts. There are 4 programmable timers with cascade mode function. DRAM memory for the processor can provided in the present example by a commodity DIMM 242. The processor 240 can be connected to a 32 bit PCI bus 241, which operates at, for example, 33 MHz/66 MHz.

A clock input to the processor 240 can be provided by a clock generator (CLK) 243. The CLK 243 can include a configurable clock generator (not shown) implemented as a programmable clock synthesizer employing a crystal used to produce CPU clock signals. The clock frequency can be determined by jumper settings (not shown). A vectored interrupt controller (I-Chip) (not shown) and a configurable core voltage regulator module (VRM) (not shown) can be provided that operate substantially as described above with reference to the like components of FIG. 5.

In the present embodiment two switch ASICs (application specific integrated circuits) 244, 245 are provided (in the present example, BCM5632 Gigabit switch ASICs). Each ASIC can provide twelve GMII Interfaces (1 Gigabit Ethernet) (for uplinks and downlinks) and one 10 Gb XGMII interface for chip-to-chip communication (bridging) 246 between the ASICs 244 and 245. Sixteen GMII 1 Gb 'downlinks', in the form of serialized Gb Ethernet data, are provided through four quad SERDES 248–251 to allow each information processing cartridge 43 to communicate with the switch 73. Eight GMII 1 Gb 'uplinks' are provided for external communication through two quad PHYs 253 and 254 (in the present example BCM5404 ASICs) and RJ45 connectors on the rear panel 122. The ASICs 244 and 245 are configured via a PCI interface (32 bit/33 MHz) to the PCI bus 241.

A Flash PROM 256 can store a real time operating system, and management and configuration data for the microprocessor. The Flash PROM 256 in the present example can be operable to hold 8 MB–16 MB of data, depending on the software required. The flash PROM 256 can be operated via an on-chip XBus 258.

Also connected to communicate with the processor 240 via the XBus 258, a Real Time Clock (RTC) 259 can be provided for real-time functions with a back-up battery.

Also connected to the XBus 258 can be a UART (Universal Asynchronous Receiver Transmitter) 260 which in turn connects to a serial bus 261 for providing an asynchronous console connection from the switch 73 to the SSP 74 which can be accessed by the SSP.

An integrated MAC/PHY (Media Access Control/Physical) switch 271 can provides its own interface to the PCI bus 241. This MAC/PHY switch 271 can connects to a 10/100 Ethernet hub 272. The hub 272 can be operable to provide a management interface to the SSP 74 and a connection from an external management network to the switch 73 and SSP 74 of a given CSSP 71. The connection from the integrated MAC/PHY device 271 to the SSP 74 can be coupled capacitively. A loopback mode can be provided by the MAC/PHY device 271 for system diagnostics. The hub 272 can connect to an RJ45 connector 273 on the rear panel 122 of the CSSP enclosure 121.

An 8 kByte I2C EEPROM 262 can be used to store the FRU-ID and is accessible by the SSP portion 74 of each CSSP 71 via a serial bus 263 and the midplane 171. The upper 2 kByte of the EEPROM 262 can be configured to be write protected.

An I2C Redundant Control Register (RCR) 275 can be used to provide an alternate, redundant path for powering-down the CSSP 71 and Shelf Level Indicators 69 mounted on the front 57 and rear 59 panels of the shelf 41. The I2C RCR 275 can be accessible by both the SSP 74 of the CSSP 71 containing the RCR and the SSP 74 of a further CSSP 71 connected via the midplane 171 via an I2C bus 276. In the present example, a device suitable for use as the RCR 275 is a Phillips PCF8574 IC.

With continued reference to FIG. 6, there now follows a description of functional elements of the Shelf Service Processor (SSP) portion 74 of a CSSP 71 as contained within the CSSP enclosure 121 and provided on an SSP PCB 232.

In the present example, communication between the Switch PCB 231 and the SSP PCB 232 is facilitated by an interboard connector pair 298 and 299. It supports connections (pins) for I2C signals, 10/100 MAC/PHY output, and power. As described above, the switch PCB 231 carries the components associated with the switch, and it also carries the power, FRU-ID and environmental monitoring components along with the connectors for connections to the midplane 171 and external connectors. Thus, in the present example, all SSP components requiring a connection to the midplane 171 or an external connection have signal paths routed through the connector pair 298, 299 and via the switch PCB 231 to the relevant midplane or external connectors.

In the present example, the SSP 74 includes a microprocessor 301 (e.g., a Power PC (MPC8245) processor) mounted on the SSP printed circuit board (PCB) 232. The processor 301 can be connected to a PCI bus 302, the present instance a 32 bit bus that operates, for example, at 33 MHz/66 MHz.

A clock input to the processor 301 can be provided by a clock generator (CLK) 303. The CLK 303 can comprise a configurable clock generator (not shown) implemented as a programmable clock synthesizer employing a crystal used to produce CPU clock signals. The clock frequency can be determined by jumper settings (not shown). A vectored interrupt controller (I-Chip) (not shown) and a configurable core voltage regulator module (VRM) (not shown) can be provided that operate substantially as described above with reference to the like components of FIG. 5.

The processor 301 can be provided with a DRAM memory 305. The memory capacity can be chosen to suit the processor addressable memory space. In the present example, 8 MB of DRAM memory is provided.

An integrated MAC/PHY switch 306 can provide its own interface to the PCI bus 302. The MAC/PHY switch 271 can be connected to 10/100 Ethernet hub 272 via the interboard connectors 298, 299. A loopback mode can be provided by the MAC/PHY switch 306 for system diagnostics.

Octal UARTs 308 and 309 can be connected between the PCI bus 302 and the interboard connector pair 298, 299. The signal path can be continued from the interboard connector pair 298, 299 to serial connections 310 on the midplane connector 141 on switch PCB 231. The Octal UARTS 308, 309 can facilitate serial communications between the SSP 74 and each of the processing cartridges 43.

Also connected to the PCI Bus 302 can be a dual UART (DUART) 312 that in turn can connect via the interboard connectors 298, 299 to serial bus 261 for providing an asynchronous console connection from the SSP 74 to the switch 73. The DUART 312 can also have an I2C connection to an external connector on the rear face 122 of the CSSP enclosure 121. The external connector can provide a common operating system/boot console and command port 311.

Connected to the processor 301 via an XBus 314 can be a Flash PROM 315. The Flash PROM 315 can store a real time operating system, and management and configuration data for the microprocessor 301. The Flash PROM 315 can be operable in the present example to hold up to 2 MB of data, depending on the software required.

Also connected to the processor 301 via the XBus 214 can be a real time clock (RTC) 316 for real-time functions with a backup battery. The RTC 316 can also provide 8 kByte of non-volatile random access memory (NVRAM), in the present instance implemented as an EEPROM. This can be used to contain information such as the FRU-ID, a serial number and other FRU information.

To facilitate I2C communications between the SSP 74 and the other CSSP 71, the midplane 171 and the PSUs 81, a multiplexer 318 can be provided. The multiplexer 318 can have a single I2C connection to the processor 301 and connections, via the interboard connector pair 298, 299 and the midplane connector 141 to both PSUs 81, the midplane 171 and the other CSSP 71.

The processor 301 can also comprise an embedded DUART to provide a redundant serial link to the SSP 74 of the other CSSP 71. Although it would be possible to implement this link using an external DUART, the advantage of using an embedded DUART is that the connection to the other CSSP is reliable and therefore likely to be functional. Where the embedded DUART link does not use the I2C Multiplexer for communications to the other CSSP, a common mode of failure for both the SSP—SSP I2C links can be avoided, it being assumed that the processor 301 is likely to be functional even if both embedded DUART channels are non-functional.

The CSSP 71 can powered from two, diode commoned, 9V power supply rails 278 and 279. DC/DC converters 281 can be used to provide the voltage levels required by the CSSP 71. The DC/DC converters 281 can be supplied by dual 9V inputs 278, 279, individually fused 285, 286 and then diode commoned 287, 288. A soft start controller 283 can be provided to facilitate hot-insertion. A 5V DC/DC converter (I2C power regulator) 282 can be turned on as soon as the CSSP 71 is fully inserted. A 3.3V DC/DC converter can be turned on when instructed, for example through SSP service software, by asserting low an appropriate signal (ON_L—not shown). The 3.3V converter can be arranged to turn on a converted for 2.5V, 1.2V, and a processor core voltage rail (Vcore) when the voltages are within an appropriate range.

When the CSSP 71 is inserted the inrush current can be limited, for example to <1 A, and the rate of rise can be configured not to exceed a predetermined value (e.g., 20 A/s) to provide a so-called soft start to facilitate hot-insertion. The intent is to prevent damage to the connectors and to avoid generating noise. A soft start controller 283, which controls a ramping-up of voltage levels, can be enabled when the predetermined signal (Inserted_L signal) is asserted low, this signal is on a short pin in the connector and is connected to ground (GND—not shown) through the midplane 171 until one of the supplies is removed. These circuits can be configured to withstand an overvoltage at their inputs whilst the input they are feeding is not powered, without any leakage to the unpowered circuit. A sense circuit can detect if the voltage has dropped below a threshold, for example 2.0V, as a result of a blown fuse, a power rail going down, etc. The DC/DC converters 281 can be protected against short circuit of their outputs so that no damage occurs.

The I2C regulator 282 can be powered as soon as the CSSP 71 is fully inserted into the midplane 171. This can be facilitated through short pins connected to the soft start controller 283, which controls a ramping-up of voltage levels. The other DC/DC regulators can be turned on, for example by SSP software.

A pair of fans 290, 291 can provide cooling to the CSSP 71. The fans 290, 291 can be configured to run at full speed to prevent overtemperature conditions by minimizing the temperature of the internal components and the fan. The speed of the fans 290, 291 can be monitored by the SSP 74 through an environmental monitor 295 on the switch board 231. The environmental monitor 295 can be alerted in the event of the fan speed falling below a predetermined value (e.g., 80% of its nominal speed). The fan can provide tachometer outputs to facilitate the measurement of fan speed.

LED indicators 137 can be provided, for example with a green power LED, an amber LED for indicating that service is required and a blue LED for indicating that the switch is ready to be removed. LED indicators integrated on 2×4 stacked RJ45 connectors on the rear face of the CSSP 71 can be arranged, for example, to show green continually when the link is present and flash green when the link is active.

The environmental monitor ENV MON 295 can be provided to maintain operational integrity of the CSSP 71. The ENV MON 295 can include limit values in limit registers and can monitor, for example, temperature within the CSSP enclosure 121, the CSSP power rails, including the 12V, 3V3, Switch Processor Core Voltage, CSSP Processor Core Voltage and the two 9V power feed rails 278, 279 from the midplane 171. The outputs of the DC/DC converters 281 can be fed in to A/D inputs of the ENV MON 295 for Watchdog comparisons to be made to the voltage limits set in the limit registers. As noted above, the ENV MON 295 can also monitor the operating speeds of the fans 290 and 291. The ENV MON 295 can communicate with the SSP 74 of both CSSPs via an I2C bus 296.

For IO to the midplane 171 (not shown), the midplane connector 141 can include sixteen 1 Gb Ethernet connections 265–268 from four quad SERDES 248–251 and the I2C bus lines 596.

The SSP 74 can access the I2C devices (FRU-ID EEPROM, 8-bit I/O expansion chip, and the system hardware monitor) through the midplane 171.

For external IO, rear panel Gb Ethernet connections can be provided from the two quad PHYs 253, 254 to 2×4 stacked RJ45 connectors 139 (to give 8 uplinks). Each port can be an independent 10/100/1000 BASE-T (auto negotiating) port. The PHY devices 253, 254 can operate in GMII mode to receive signals from the 8-Gigabit interfaces on the ASICs 244, 245.

The Power Supply Units (PSUs) 81 can configured such that when two or more PSUs 81 are connected in parallel in the shelf 41, failure of any one of the paralleled units shall not affect system operation. Moreover, one of the PSUs can be installed or removed from a "live" system with or without input power applied. The outputs can have overcurrent protection.

The PSU can have an I2C interface to provide power supply status via the midplane 171. The PSU can have an internal temperature sensor that reports via the I2C interface. The PSU fan speed can also be monitored and errors are reported via the I2C interface. Overvoltage and overcurrent sensors can also report via the I2C interface.

Figure 7:
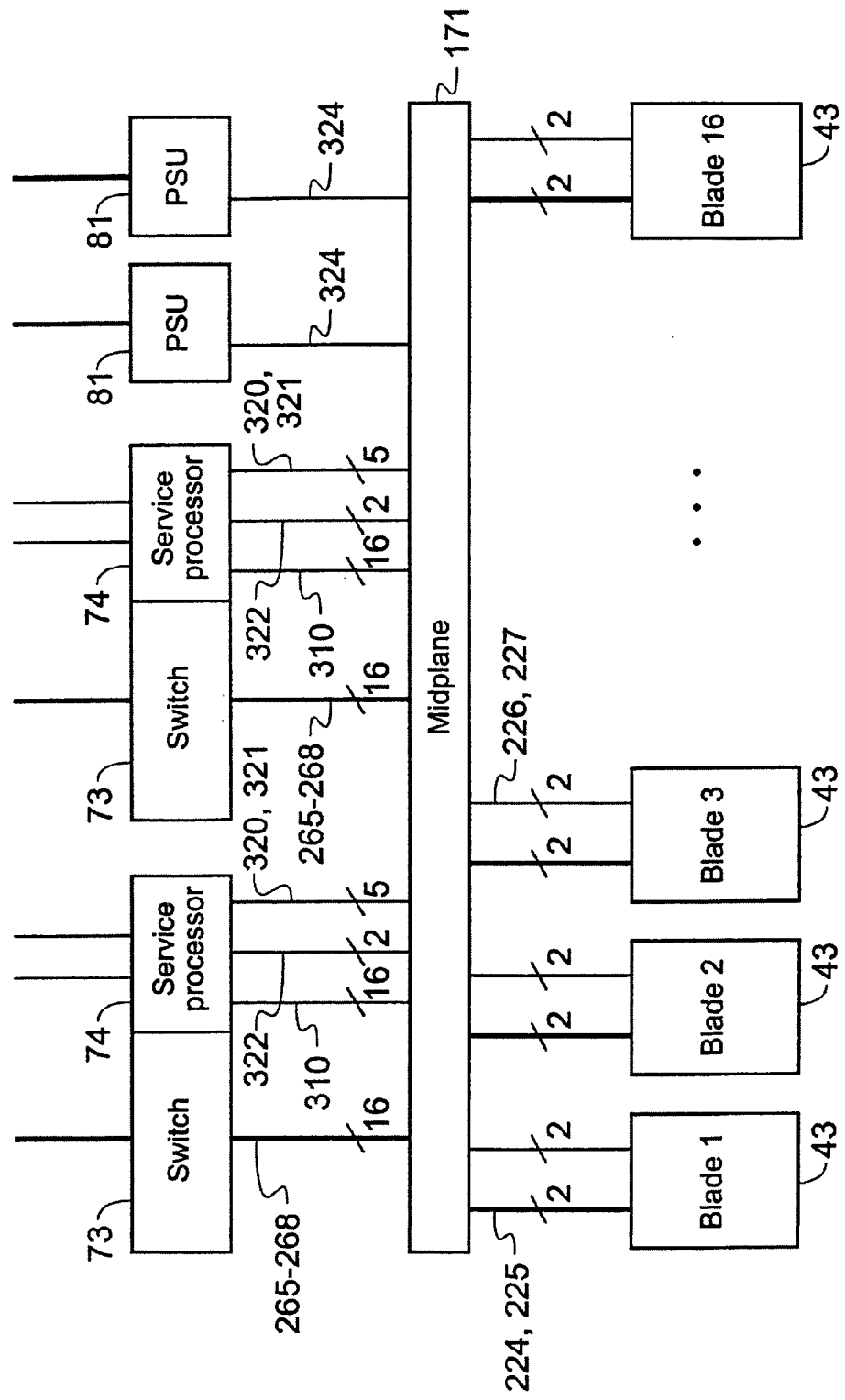
FIG. 7 is a functional block diagram showing the connectivity between the components of the shelf of FIG. 2.

With reference to FIG. 7, there will now be described an example of data connectivity between the FRUs and midplane of the shelf 41. Power transmission paths are not illustrated in FIG. 7. However, it will be appreciated that to facilitate the maximum component redundancy of the shelf 41, each PSU 81 can independently provide power to each FRU.

In the present example each of the processing cartridges (blades) 43 connects to the midplane 171 via a pair of information signal connections (e.g. Gb Ethernet links) 224, 225 and a pair of serial management signal connections 226, 227. Connections within the midplane 171 can ensure that each Ethernet link 224 is directed to a connection 265–268 from the midplane 171 to a first switch 73, and that each Ethernet link 225 is directed to a connection 265–268 from the midplane 171 to a second switch 73. Thus one Ethernet link can be established between each processing cartridge 43 and the switch 73 of each CSSP 71. Further connections within the midplane 171 can ensure that each serial connection 226 is directed to a connection 310 from the midplane 171 to the first SSP 74 and that each serial connection 227 is directed to the second SSP 74. Thus one serial link can be established between each processing cartridge 43 and the SSP 74 of each CSSP 71. As mentioned earlier, information signal connections other than Gb Ethernet connections (e.g. Infinband connections) could be employed in other examples.

A plurality of serial connections can connect each SSP 74 to the other. Serial lines 320, 321 can connect each SSP 74 to the midplane 171 and connections within the midplane can connect the two sets of lines together. To provide a control interface from the SSPs 74 to the PSUs 81, serial lines 322 can connect each SSP 74 to the midplane 171 and connections within the midplane 171 can connect to serial lines 324 from the midplane 171 to each PSU 81.

An example of data and control connectivity of the shelf 41 to and from computer systems external to the shelf 41 when the shelf 41 is arranged for use within a multiprocessor server system such as that described above with reference to FIG. 1 will be described with reference to FIG. 8.

As summarized above with reference to FIG. 7, in the present example each processing cartridge, or blade, 43 is connected to the switch 73 of each CSSP 71 by an information signal connection (e.g. a 1 Gb Ethernet link) formed by a combination of links 224, 225 from the processing cartridge 43 to the midplane 171, connections within the midplane 171 and links 265–268 from the midplane 171 to each switch 73.

Further, in this example a set of serial management signal connections comprising links 320, 321 and connections within the midplane 171 connect the SSP 74 of each CSSP 71 to the SSP 74 of the other CSSP 71.

To provide external data connectivity between the shelf 41 and an external core data network 330, in association with which all information processing performed by the processing cartridges 43 of the shelf 41 is undertaken, connections 331 can be formed between the core data network 330 and the eight 1 Gb Ethernet ports 139 provided on the rear panel 122 of the CSSP enclosure 121.

In the present example, the connections by means of which control and configuration of the shelf 41 are performed are entirely separate to the connections to the core data network 330. Therefore, a first external switch 335 can connect to a management (I2C) port 273 of the first CSSP 71 and a second external switch 336 can connect to a management (I2C) port 273 of the second CSSP 72. As described above with reference to FIG. 6, the management port 273 can provide a management network interface to both the switch 73 and SSP 74 of each CSSP 71. The external switches 335, 336 can each be connected to each of a pair of System Management Server (SMSs) 338, 339. The SMS is not essential to the operation of the shelf 41, but use thereof aids optimal operation of the shelf 41. In a typical multiprocessor server system a plurality of shelves 41 may be connected together via the core data network 330 under the control of a single management network utilizing one set of SMSs 338, 339. A set of SMSs 338, 339 may comprise a single SMS (as well as a plurality thereof). However use of at least two SMSs enables redundancy of components, therefore increasing overall system reliability.

A serial interface control 343 operable under telnet protocol control is also connected to the shelf 41 in the present example. This can provide a common operating system/boot console connection to the SSP 74 of both CSSPs 71 via the RJ45 connector 311 on the rear panel 122 of each CS SP enclosure 121.

It will be appreciated from the above that a flexible and scalable modular computer architecture has been described. In the described example up to 16 information processing cartridges, or blades 43, can be configured as sealed FRUs on a single shelf 41, the number of blades being chosen according to customer requirements. Each blade has its own processor and random access memory. If, for example, there is a maximum of 2 Gbytes of memory per information processing cartridge, and one processor per blade, 16 processors (16P) with 5.33 processors per unit height (1U) and a total of 32 GB of memory per shelf can be provided.

In the present example, the shelf 41 incorporates redundant combined switch and shelf service processor modules (CSSPs) 71 and redundant power supply units (PSUs) 81 separate from the blades 43. As the power supplies are carried by the shelf, the information processing cartridges can be kept compact and inexpensive. Also, as a result, they can be powered by DC power only, via the midplane 171.

Also, as mentioned earlier, the FRUs (e.g., the information processing cartridges, or blades, 43, the CSSPs 71 and the PSUs 81) can all be configured as sealed units that do not contain any internal FRUs themselves and do not contain user serviceable items. The enclosures of the FRUs can be arranged to enclose all of the functional components of the FRU with only electrical connectors being externally accessible and with indicator LEDs being externally visible as well.

These factors can all contribute to keeping the cost of the FRUs low, as well as that of the overall system. The modular approach with the use of sealed modular field replaceable units for providing system functionality and with non-field replaceable units designed with a minimum possible number of active components enhances reliability. Moreover, easy and rapid maintenance is facilitated in the event of a failure of a FRU by simple replacement of that FRU, further reducing the cost of ownership.

Thus, it will be appreciated from the above description that the provision of a rack mountable shelf, that includes power supplies, a shelf service processor and switches in modular units, for carrying a number of processing cartridges, wherein the number of processing cartridges can be chosen according to customer requirements, provides a flexible and scalable computer configuration. The balancing of the load between the processors of the processing cartridges can be effected by software using conventional principles.

A configuration as described provides an easily scalable processor architecture, whereby the processing power provided by a complete system based on the information processing cartridge/information processing cartridge carrier architecture can be scalable from moderate to very high capacity through the simple addition of further information processing cartridges.

Figure 9:
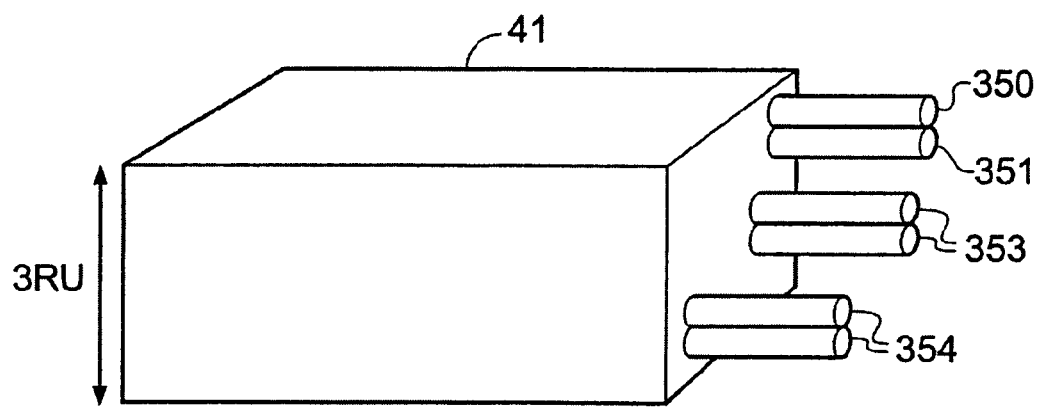
FIG. 9 is a schematic representation of a shelf showing the external connections from the shelf of FIG. 2.

As illustrated in FIG. 9, an example of the external connections from a shelf 41 can be in the form of two active information signal connections (e.g., Ethernet connections) 350 and 351, two active power connections 353 and an active/standby pair of management connections 354. With regard to the management connections, each connection comprises a serial connection and a network (e.g. Ethernet or Infiniband) connection. It is possible to connect to either the active or the standby connection, as the incoming signal will be internally routed to whichever management controller (CSSP) is the current master. It will be appreciated, therefore, that the connections to a shelf can be kept to a minimum. It will further be appreciated from the configuration shown in FIG. 9 that the system is scalable beyond a single shelf unit 41.

Figure 10:
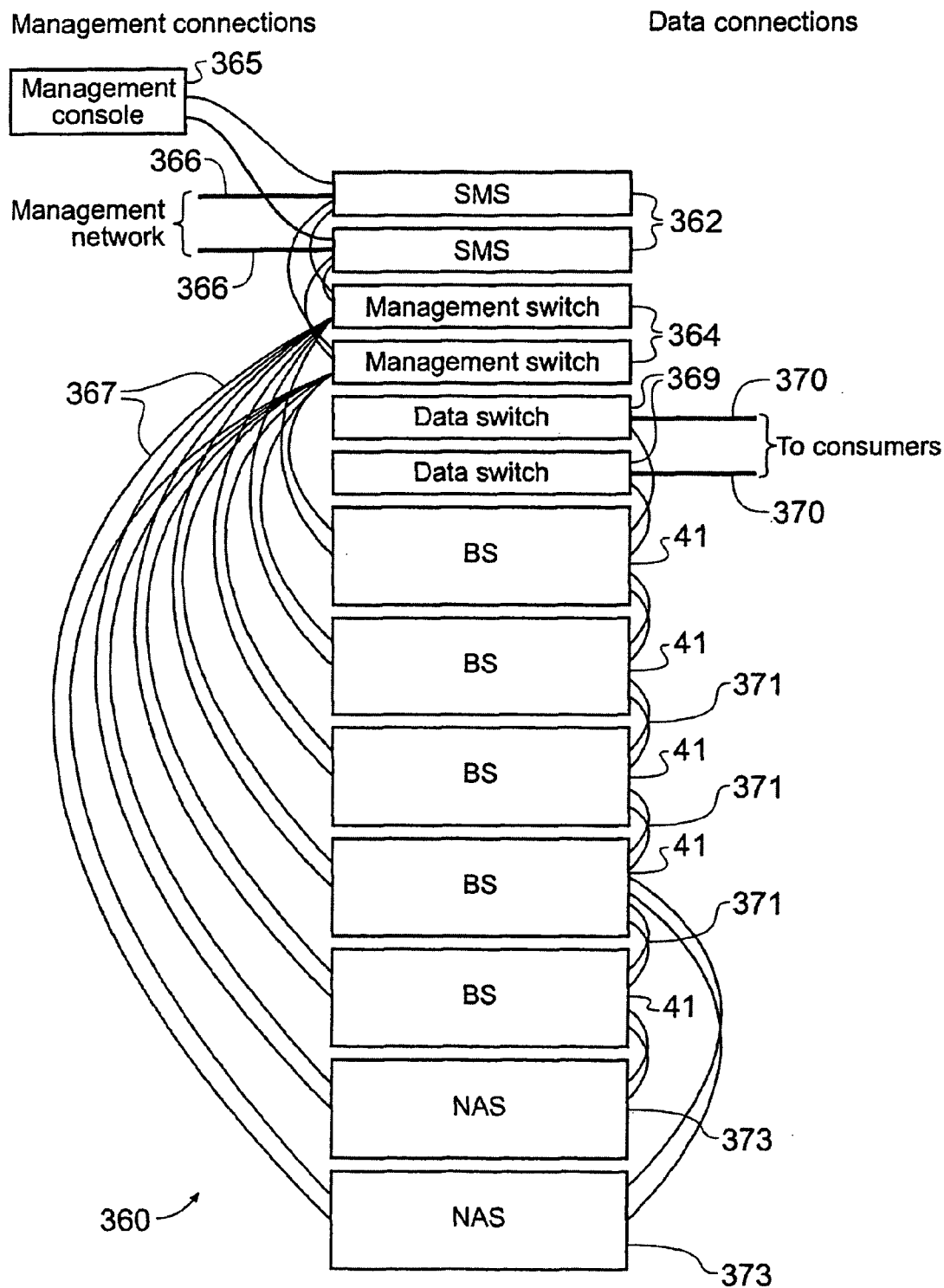
FIG. 10 is a schematic representation of a rack mounted system comprising a plurality of such shelves.

FIG. 10 illustrates how a plurality of shelves can be configured within one (or more) racks to provide even higher processing power. Such a constellation of shelves to provide a large grouping of servers is sometimes termed a "web farm" or "server farm" 360. As shown in FIG. 10, the web farm comprises a plurality of shelves 41 that each carry a plurality of blades 43. Also provided are a plurality of Network Attached Storage devices (NAS) 373 for providing storage for critical data, e.g. email data storage, for the web farm. The NASs 373 are not required if there is no critical data to be stored, e.g. if the web farm is operating solely to provide web caching services.

Management control of the web farm 360 can be provided through a pair of System Management Servers (SMSs) 362. Each SMS 362 can be connected to a management network via a link 366 and to a management console 365. The management console can be configured by programming a conventional personal computer or workstation, comprising a processor, memory, storage, user input/output devices, a display, network adapters, etc. The SMSs 362 can communicate with the individual shelves 41 via a pair of management switches 364. Each shelf 41 and NAS 373 can be connected to each management switch 364 via a connection 367. Thus dual redundant management connections can be provided to each shelf 41 and NAS 373.

Flow of data to and from the web farm 360 can be provided through a pair of data switches 369. Each data switch 369 can be connected to a consumer network via a link 370. It is to be understood that the consumer network can be a larger data network to which the web farm 360 is connected. This network can be an office or corporation intranet, a local area network (LAN), a wide area network (WAN), the Internet or any other network. Connections between the data switches and the shelves 41 can be facilitated by connections 371. It is to be noted that as each shelf has its own switching capability, there is no need for each shelf 41 to be directly connected to the data switches 369. Connections can also be provided to connect the NAS units 373 to the shelves 41. The topology used for interconnection of the data switches 369, shelves 41 and NASs 373 can be any topology providing at least one connection of any length between every possible pair of units. Complex topologies arranged to minimize the maximum connection length between any two given units in the web farm can be used.

The web farm 360 comprising a plurality of shelves 41 with or without a plurality of NASs 373 can suitably be used as any or all of the entry edge server group 9, web edge server group 15 and application servers 19 described above with reference to FIG. 1.

As an alternative to providing critical data storage within a NAS 373, such storage can be provided within one or more NAS cartridges fitted into one or more of the shelves 41 in place of processing cartridges 43. Another alternative is to provide a server shelf with local storage such as a RAID array (Redundant Array of Inexpensive Disks) in place of the NAS 373.

Thus there has now been described an example of a fully configurable computing system based on a plurality of self contained field replaceable units (FRUs) and scalable from a single processing cartridge with power supply and switching capability to a multiply redundant multiprocessor server system with full system management capability extending over a number of co-operably connected server shelves. It will of course be readily apparent to the skilled reader that many of the specific features specified in the above description are in no way limiting and a variety of alternatives may be produced using only ordinary skill and common general knowledge. Non-limiting examples of example modifications which may be made to the above described system are discussed hereafter.

There is no limit placed on the processing cartridges as to what software they should run. Each module within a shelf or farm may run under the same operating system, or a plurality of different operating systems may be used. Examples of possible operating systems include Sun Microsystems' Solaris® OS or another UNIX™-Type OS such as Linux™, MINIX™, or Irix™, or UNIX™ or a Microsoft OS such as Windows NT™, Windows 2000™, Windows ME/98/95™, Windows XP It is also not necessary that each processing cartridge within a shelf or farm be configured to run the same program software. For example, individual processing cartridges may be configured to execute, for example, fileserver software, mailserver software, webhosting software, database software, firewall software, or verification software.

Although in the described example, the functionality of a switch and of a shelf service processor is provided within a single combined switch and service processor unit, this is not essential and separate switch and shelf service processor field replaceable units may be used.

Although it has been described above that a pair of PSUs and a pair of CSSPs may be provided so as to enable dual-redundancy, further PSUs and CSSPs may be rovided so as to increase FRU redundancy further, thus providing statistically higher reliability.

In the power supply circuitry in each of the blades and CSSPs, two voltage sense circuits may be provided after the fuses and before the diodes, to prevent a latent fault caused by a failed fuse going undetected until one of the PSUs is removed or taken offline. Such circuits may configured to withstand an overvoltage at their inputs whilst the input they are feeding is not powered, without any leakage to the unpowered circuit.

Although it has been described above with particular reference to FIG. 5 that the processing module may be based on an UltraSPARC™ processor, this is not limiting and any other processor having sufficient processing capacity to undertake the tasks required of a particular processing cartridge may be used. Alternative processors include, but are not limited to, Intel x86 series and compatible processors, AMD x86 compatible processors, Alpha processors and PowerPC processors.

Although it has been described above that each information processing cartridge comprises a single microprocessor, this is not a limiting case as each or any of the information processing cartridges may have more than one microprocessor arranged to share common storage resources to operate synchronously (in lockstep) or asynchronously. Also, it is not necessary that all information processing cartridges inserted into a shelf at a given time are identical, rather a variety of different blade architectures may be used simultaneously.

The provision of the functions of both Switch and Shelf Service Processor within a single FRU in the present example provides a facility within a single shelf 41 for dual redundancy in both functions in fewer different FRUs. As will be appreciated, there is no restriction that these two functions must be provided within a single FRU and division of the two functions into separate FRUs would present no difficulty to the skilled addressee.

One aspect of ensuring maximum possible computer availability relates to service and management of a computer system. In particular, service and management functions are in general required for monitoring system status and performing control actions in response to monitored parameters. There now follows an example of how service functions may be organized to be implemented in a hierarchical manner through different components of a modular computer system.

As described above with reference to FIG. 5, each information processing cartridge 43 has a blade service controller 203. The blade service controller 203 is a local controller of service functions for each information processing cartridge 43. Each blade service controller 203 is arranged to be able to communicate with the SSP 74 (see FIGS. 6 and 9) of each CSSP 71 via the connections 226, 227 and 310. The SSP 74 provides shelf-level service functions for the population of each shelf 41, which includes the PSUs 81 and the switches 73 of the CSSPs 71 as well as the processing cartridges 43. Each SSP 74 is arranged to be operable to communicate with an external system management server (SMS) 338, 339 via I/O connector 273 as illustrated in FIG. 8. The system management server provides system level service functions for one or more shelves 41. The system management server may also provide service functions to computer system modules other than shelves 41 within a computer system, for example to individual server units and/or to reliable storage units such as Network Addressable Storage (NAS) units.

In the present example, the blade service controller 203 can provide the following service functions. It typically performs environmental monitoring of the information processing cartridge 43 within which it is situated, this includes monitoring of CPU and ambient temperatures by means of the environmental monitor 215, monitoring of the power supply rails from the DC to DC converter 218 and monitoring of the speed of the processor cooling fan 214. The blade service controller 203 may also perform a watchdog function for monitoring the operating system running on the processor of the processing cartridge 43. The blade service controller 203 can also provide an out-of-band interface between the processing cartridge 43 and the CSSP 71. The out-of-band interface is a physically discrete interface which is independent of the operating system and applications running on the processor, this interface may be used for providing processor cartridge parameters to the shelf SSPs 74 at boot. In addition, the blade service controller 203 may also provide local functions for control of the LED service indicators 119 and control of power on reset (POR) and externally initiated reset (XIR) to the processor. In the present example, there is no requirement for the blade service controller 203 to have any level of intelligence, it being sufficient that it is capable of performing simple watchdog and threshold type monitoring operations. However, the blade service controller 203 may be implemented having intelligence, which may be of particular benefit in the event that it is tasked with more complex functions than those set out above.

The SSP 73 (of which two are typically provided within a shelf 41 to provide redundancy) provides the following functions in the present example. It typically performs environmental monitoring for the shelf 41, monitoring the PSUs 81, the CSSPs 71 and the PSU inputs. The SSP 73 can also aggregate data from the blade service controller 203 of each blade 43 present in the shelf. The SSP 73 may also be configured to make decisions regarding aspects such as power control, control of the shelf service indicator LEDs 69 and to provide instructions to the blade service controllers 203. In the present example, the SSP 74 is not responsible for deployment of software to individual processing cartridges, however this function may be provided by the SSP 74 in alternative arrangements.

In order to provide a facility for manual monitoring and control of the SSP 74, it may be configured to have a user interface via which a user can be provided access to the functions and data of the SSP 74. The user interface access may be provided through one of the external serial interface connection 311 and the external network connection 273. The SSP 74 may be operable to operate as an isolated unit with no higher level service control provided. In general the SSP 74 requires little or no user intervention to manage the operation of a single shelf 41.

Fault management may be controlled by the SSP 74 such that a failed processing cartridge 43 (the failure of which may be detected, for example, from data provided by a blade service controller 203 indicating a failure of the processing cartridge's operating system or application or from errors detected in the switch 73) may be remotely restarted by the SSP 73, in the present example either by initiating an externally initiated reset (XIR) to the processor of the processing cartridge, or by causing an interruption in the power supply to the processing cartridge sufficient to cause a power on reset (POR) to the processor of the processing cartridge. In the present example, a failed processing cartridge will be the subject of a predetermined number of restart attempts before that processing cartridge is considered permanently failed, at which time the processing cartridge is removed from service in that it is ignored by the SSP 74 and the switch 73 is instructed not to pass traffic to it and to ignore any traffic from it and the failed nature is reported to any higher level service control to which the SSP 74 is connected.

In order to perform the above described functions, the SSP 74 of the present example is configured to have a degree of intelligence such that decision making steps and provision of a user interface are supported.

Figure 8:
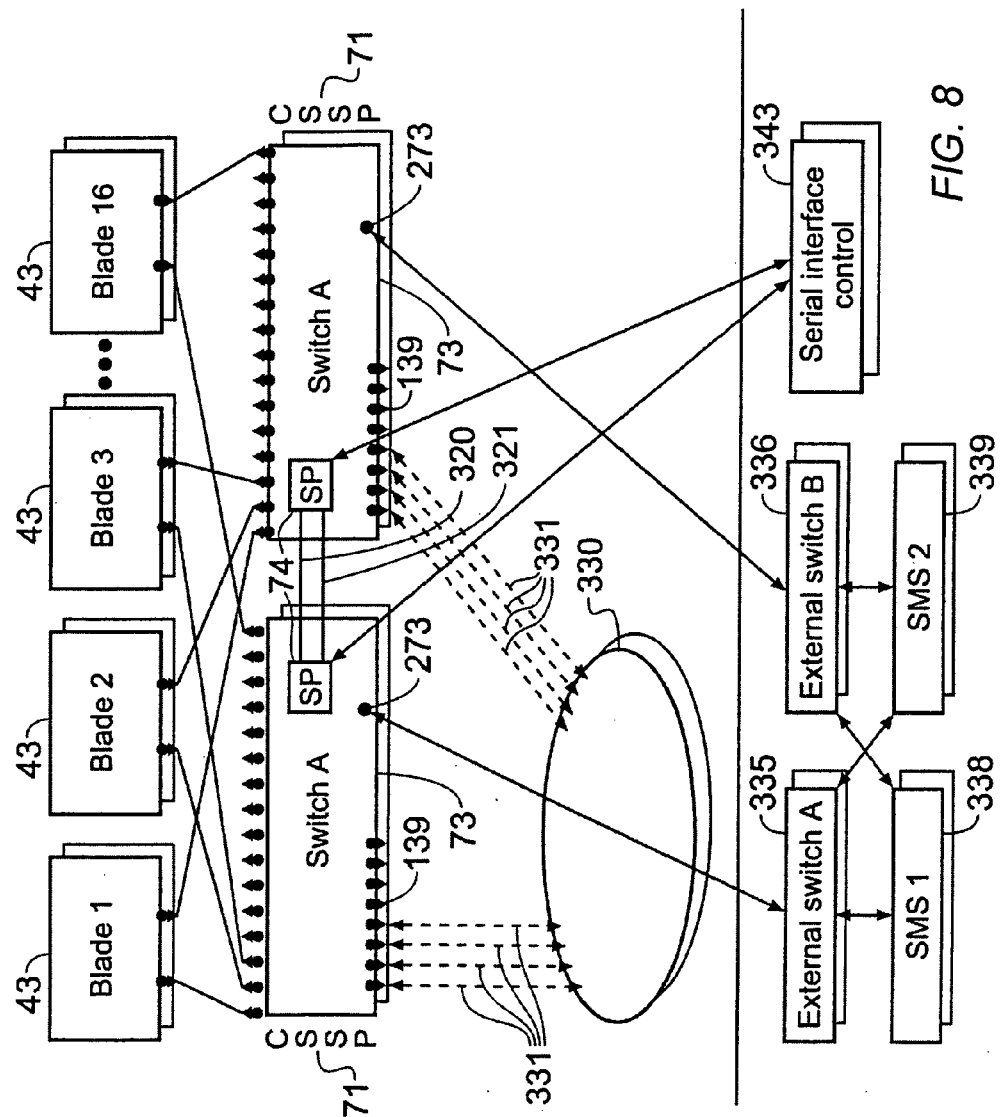
FIG. 8 is a functional block diagram showing the external connectivity of the shelf of FIG. 2.

The system management server (SMS), of which two (338 and 339) are typically provided as a clustered pair for redundancy (as illustrated in FIGS. 8 and 10), is in the present example configured to provide the following functions. The primary use of the server management system 338, 339 of the present example is to provide aggregate management and monitoring for a number of shelves 41 (as illustrated in FIG. 10). By means of such aggregated monitoring and management, a single (clustered pair of) system management server(s) can oversee the running of a large number of computer system shelves 41.

The system management server (SMS) 338, 339 may also be operable to perform hardware fault failover in response to hardware failures detected by the system management server or reported to it by an SSP 74 of a particular shelf 41. In addition, the system management server 338, 339 of the present example may be operable to perform software deployment to individual processing cartridges. In alternative arrangements, the system management server 338, 339 may be operable to allow platform specific abstraction.

By platform abstraction is to be understood that the SMS 338, 339 may be operable to allow platform specific abstraction such that the user may configure computing services without knowledge of the underlying hardware providing these services. For example a user may require a web server which can cope with, say, 1000 connections per an hour. The SMS 338, 339 may be pre-configured with enough platform specific data to determine how many blade servers are required to fulfil this requirement, based on their processor, memory size, etc and provision the web service on that number of blade servers without the user needing to know anything about the server hardware details himself.

The operation of the system management server 338, 339 may be controlled via a management network 366, such that control may be automated (via a higher level of system management) or manual (via a terminal to the management network 366) or a mixture of both. The system management server 388, 399 may also be directly connected to a management terminal 365 for direct operator control of the particular system management server. In order that the above functions may be implemented in the system management server, the system management server may be configured to have a level of intelligence appropriate to the making of decisions and controlling of failover and deployment.

In a network connected system as described above, a mechanism is needed to provide effective remote management of the components of the network connected system.

An example of the invention provides an apparatus and method of providing effective remote management of the components of such a network connected system or device as that described above.

In particular, an example of the present invention can represent the managed system as one or both of physical and logical entities. A physical entity is one that "obeys the laws of physics" (e.g., a component such as a thermocouple). A logical entity is one that provides an abstract representation and possibly some associated service (e.g., a sensor object that could report a temperature, but also model programmable thresholds and be the source of alarms). Where both physical and logical representations are provided, an embodiment of the invention enables the two to be associated by a relationship that indicates what logical entities are realized by each physical entity.

The described example is intended to operate under the Simple Network Management Protocol (SNMP), although other protocols could be used. There follows a brief description of the principles of SNMP. The Simple Network Management Protocol (SNMP) is an open internet standard for management of networked devices (systems). It is defined, in line with other internet standards, by a number of RFCs. There are two versions of SNMP of interest here, SNMPv1, RFC1157/STD 15 (see http://www.ietf.org/rfc/rfc1157.txt) being the root document from which the other related RFCs are referenced, and SNMPv2 (a superset of SNMPv1) which is defined by a supplementary set of RFCs, the most significant with respect to the semantics and structure of managed objects being RFC2578 (see http://www.ietf.org/rfc/rfc2578.txt). Further information about SNMP can be found in the above referenced standards.

SNMP is a network protocol which allows devices to be managed remotely by a management controller termed a Network Management Station (NMS). The NMS can be implemented in, for example, the management console 365 illustrated in FIG. 10. The NMS can include a software component called an SNMP mediator that is operable, in the present example, to mapping between a CIM_based model and SNMP MIBs. In order to be managed, a device has an SNMP Agent associated with it. The Agent is responsible for receiving requests for data representing the state of the device from the NMS and providing an appropriate response. The Agent can also accept data from the NMS in order to allow control of the state of the device. Additionally, the Agent can generate SNMP Traps, which are unsolicited messages sent to selected NMS(s) to signal significant events relating to the device. The Agent can be implemented at various levels within the managed system, for example in the SMSs 362 of FIG. 10. It can also be implemented, at least in part in the service processors 74 in the shelf.

In order to manage/monitor devices the device characteristics are represented using a format known to both the Agent and the NMS. These characteristics can represent properties of physical entities such as fan speeds, or services such as routing tables. In an example of the invention, they can also implement logical entities such as services that can be managed. The data structure defining these characteristics is known as a Management Information Base (MIB). This data model is typically organized into tables, but can also include simple values. An example of the former is routing tables, and an example of the latter is a timestamp indicating the time at which the agent was started.

The MIB is defined using a language called ASN.1. For reference, the structure of the MIBs for SNMPv2 is defined by its Structure of Management Information (SMI) defined in RFC2578 (see http://www.ietf.org/rfc/rfc2578.txt). This defines the syntax and basic data types available to MIBs. The Textual Conventions (type definitions) defined in RFC2579 (see http://www.ietf.org/rfc/rfc2579.txt) define additional data type and enumerations.

In order for an NMS to manage a device via its Agent, the MIB corresponding to the data presented by the Agent can be loaded into the NMS. The mechanism for doing this varies depending on the implementation of the network management software. This gives the NMS the information required to address and correctly interpret the data model presented by the Agent. MIBs can reference definitions in other MIBs so in order to use a given MIB, it may be necessary to load others.

The MIB is a definition for a virtual datastore accessible via SNMP, the content being provided either by corresponding data maintained by the Agent, or by the Agent obtaining the required data on demand from the managed device. For writes of data by the NMS to this virtual data, the Agent will typically perform some action affecting the state either of itself or the managed device. In the present example, the MIB is defined in terms of Object Identifiers (OIDs) which uniquely identify each data entry.

An OID consists of a hierarchically arranged sequence of integers, providing a unique name space. Each assigned integer has an associated text name. For example, the OID 1.3.6.1 corresponds to the OID name iso.org.dod.internet and 1.3.6.1.4 corresponds to the OID name iso.org.dod.internet.private. The numeric form is used within SNMP protocol transactions, whereas the text form is used in user interfaces to aid readability. Objects represented by such OIDs are commonly referred to by the last component of their name as a shorthand form. In order to avoid confusion arising from this convention, it is normal to apply an MIB-specific prefix, such as Plat (short for "Platform"), to all object names defined therein.

Figure 11:
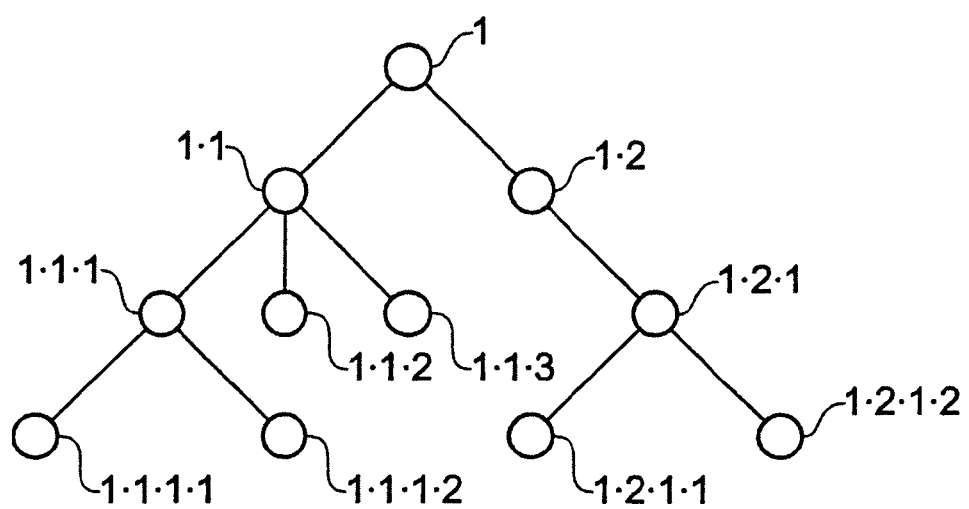
FIG. 11 illustrates the derivation of Object Identifiers (OIDs)

FIG. 11 is a schematic representation of the principle under which an OID is generated. It can be seen that it is generated according to a tree structure where each of the nodes at the various levels in the tree are given respective additional address integers separated by dots.

All addressable objects defined in the MIB have associated maximum access rights, for instance, read-only or read-write, which determine what operations the NMS 28 will permit the operator to attempt. The Agent is able to apply lower access rights as required, that is, it is able to refuse writes to objects which are considered read-write. This refusal may be done on the grounds of applicability of the operation to the object being addressed, or on the basis of security restrictions which can limit certain operations to restricted sets of NMS. The mechanism used to communicate security access rights is that of community strings. These are simply text strings such as 'private' and 'public' that are passed with each SNMP data request.

Much of the data content defined by MIBs is of a tabular form, organized as entries consisting of a sequence of objects (each with their own OIDs). For example, a table of fan characteristics could consist of a number of rows, one per fan, with each row containing columns corresponding to the current speed, the expected speed, and the minimum acceptable speed. The addressing of the rows within the table can be a simple single dimensional index (a row number within the table, for instance '6'), or a more complex, multi-dimensional, instance specifier such as an IP address and port number (for instance 127.0.0.1, 1234). In either case a specific data item within a table is addressed by specifying the OID giving its prefix (for instance myFanTable.myFanEntry.myCurrentFanSpeed) with a suffix instance specifier (for instance 127.0.0.1.1234 from the previous example) to give myFanTable.myFanEntry.myCurrentFanSpeed. 127.0.0.1.1234.

Each table definition within the MIB has an INDEX clause that defines which instance specifier(s) to use to select a given entry. The INDEX clause defining the MIB syntax provides an important capability whereby tables can be extended to add additional entries, effectively adding extra columns to the table. This is achieved by defining a table with an INDEX clause that is a duplicate of that of the table being extended.

Although the present example of an embodiment of the invention is arranged to work within the Simple Network Management Protocol, it extends the concepts employed in conventional SNMP environments to enable a more efficient representation of the managed resources of the managed resources. An embodiment of the invention presents the managed device as a collection of nested resources within a Chassis. Some resources may be nested directly within the Chassis, such as a motherboard, or a network connector. Other devices may be nested within other resources, for example a motherboard may include a processor or a drive may hold a disk. These relationships extended from the Chassis form a hierarchy of hardware resources. This hierarchy is modeled using relationships between managed objects representing the resources.

An example embodiment of the invention employs a set of common platform building blocks representing fundamental hardware resources. These platform building blocks are called "managed objects". A hardware resource will be represented by a managed object if it can be monitored or provide useful configuration information.

Additional managed objects are used to represent other features of the management interface; for example, hardware resources can issue asynchronous status reports, called notifications, in response to problems or changes in configuration.

Managed objects are defined in terms of "managed object classes". Characteristics of a resource are represented by "attributes" of the managed object. New classes, called subclasses, are defined in terms of existing classes. A subclass inherits all the characteristics of its superclass, but represents its own characteristics by adding new attributes and notifications.

Figure 12:
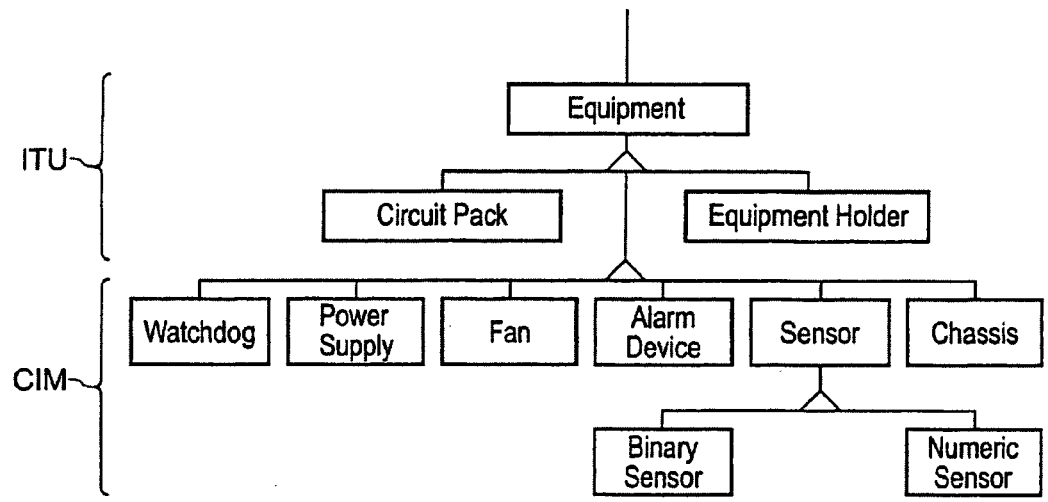
FIG. 12 represents a hardware resource class inheritance diagram.

FIG. 12 illustrates a resource class inheritance diagram for hardware components of a managed device. FIG. 12 illustrates the class names for various building blocks defined within an embodiment of the invention and illustrates the relationship between them. In this example all of the various components are instances of the equipment class. Also, the Binary and Numeric Sensors are instances of the class of sensor.

The classes employed in an example of the invention can be based on industry-standard management concepts and can incorporate information based on different industry standard management models to provide the desired combination of logical and physical aspects.

Figure 13:
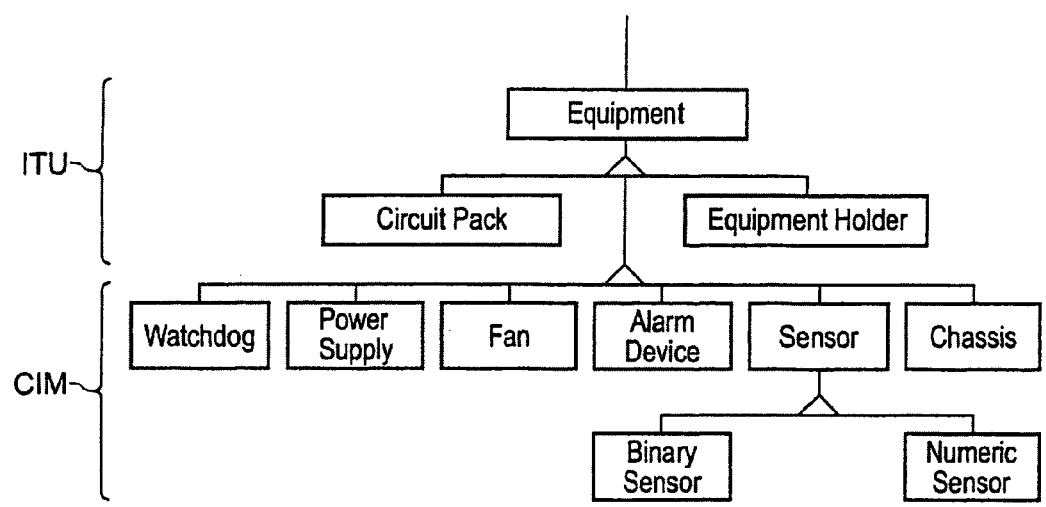
FIG. 13 represents a supported subset of ITU-T GNIM classes.

For example, FIG. 13 represents a subset of the subset of the ITU-T Generic Network Information Model (GNIM). The GNIM provides a powerful and extendable framework that supports uniform fault and configuration management in a Telecommunications Management Network (TMN). The ITU-T GNIM has been specialized through inheritance to provide managed object classes that represents characteristics of different types of resources. An example of the invention can extend the GNIM equipment class using the so-called Distributed Management Task Force Common Interface Model (DMTF CIMv2) concepts.

Figure 14:
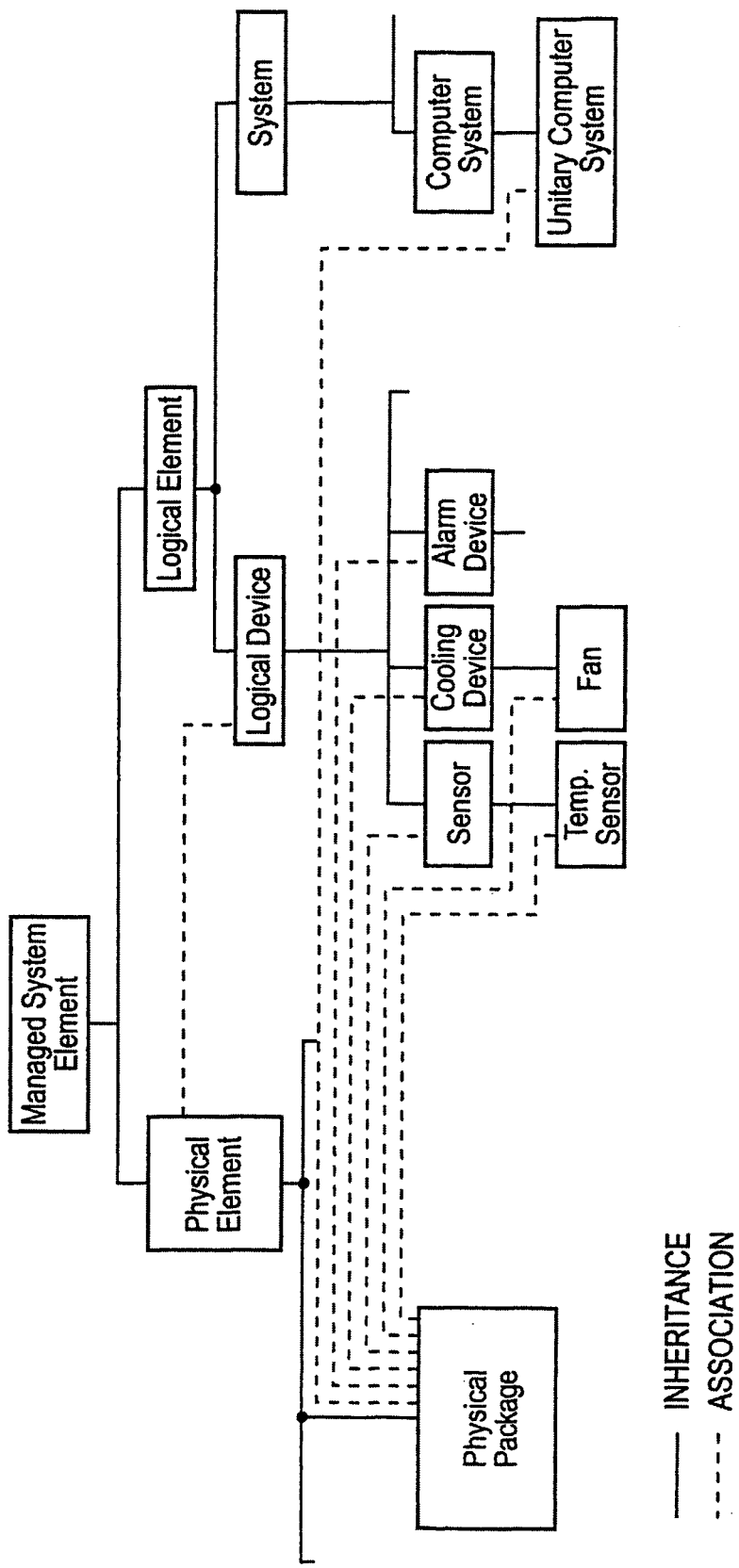
FIG. 14 represents a subset of the Common Interface Model.

FIG. 14 represents a subset of the Common Information Model (CIM). The CIM provides a model for describing overall management information in a network/enterprise environment. CIM comprises a Specification and a Schema. The Specification defines the details for integration with other management models, while the Schema provides the actual model descriptions. More details of CIM can be found, for example, at http://www.dmtf.org/standards/standard_cim.php. In particular, FIG. 14 represents a subset of the CIM schema. As can be seen in FIG. 14, the CIM schema can model physical and logical entities, as well as associations (for example "realized by" associations) between logical and physical entities. In other words, a logical entity can be realized by a given physical entity as represented by a realizes association. In FIG. 14, inheritance between objects is identified by solid lines and associations are represented by dashed lines.

Within the hierarchy illustrated in FIG. 12, the upper two layers can be represented, for example, using an ITU model and the lower two layers by using the CIM.

An embodiment of the present invention provides a novel mapping of the managed physical and logical objects and their associations. This novel mapping results in a tabular representation based on the conventional MIB representations, but uses these representations in a new way to mirror the associations between physical and logical entities.

The Agent of one example of the invention can use SNMP MIBs to represent the managed objects of the device to which the agent is allocated. These SNMP MIBs include the so-called Entity MIB 90 (defined in RFC2737), and a Platform MIB 130. The format of the Entity MIB 90 can be defined, for example, in accordance with IETF standard RFC2737 (see http://www.ietf.org/rfc/2737/text). The Platform MIB 130 is configured to form an extension to the Entity MIB 90 for adding further entity specific information and also for representing associations between logical and physical entities, for example by means of realizes associations.

Figure 15:
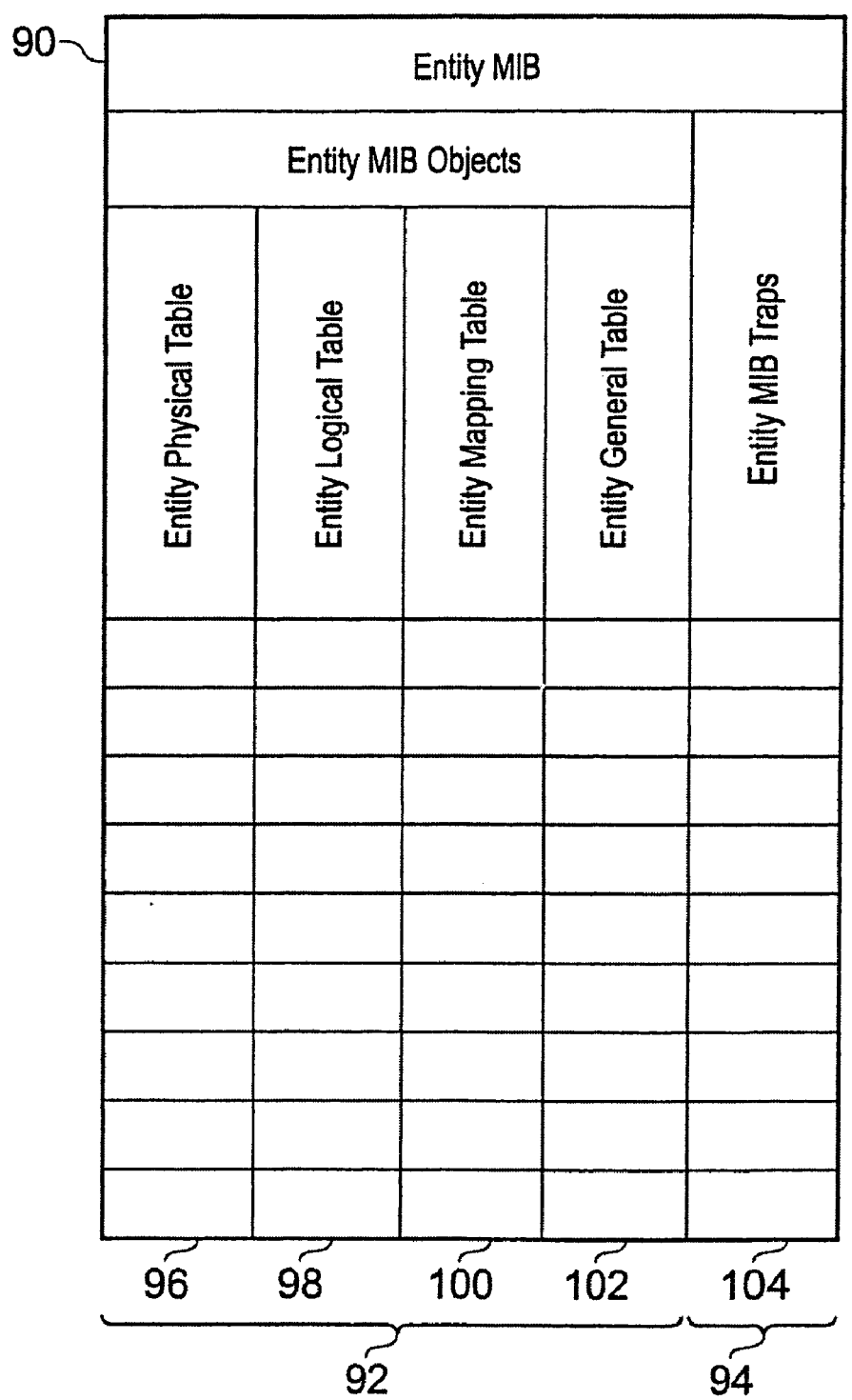
FIG. 15 represents a logical entity table.

FIG. 15 illustrates an example of an Entity MIB 90. As illustrated in FIG. 15, the Entity MIB 90 provides a row per resource (typically per hardware resource). These rows are called entries and a particular row is referred to as an instance. Each entry has a unique index (entphysicalIndex) (106—see FIG. 16) and identifies a physical class (entPhysicalClass) for the entry (110—see FIG. 16). The Entity MIB 90 can be configured in two groups, namely an entityMIBObjects group 92 containing poll-able SNMP objects, and an entityMIBTraps group 94 containing SNMP trap definitions.

The entityMIBObjects group 92 can include 4 groups to describe the physical and logical elements of the managed system, namely groups termed the entityPhysical group, the entityLogical group, the entityMapping group and the entityGeneral group.

The entityPhysical group can be represented in a physical entity table (or EntPhysicalTable) 96 and can describe the physical entities managed by an agent (i.e. an identifiable physical resource within a managed system). Section 2.1 of RFC2737 includes a definition of a 'physical entity' or 'physical component' as follows: "A 'physical entity' or 'physical component' represents an identifiable physical resource within a managed system. Zero or more logical entities may utilize a physical resource at any given time. It is an implementation-specific manner as to which physical components are represented by an agent in the physical entity table 96. Typically, physical resources (e.g., communications ports, backplanes, sensors, daughter-cards, power supplies, the overall chassis) which can be managed via functions associated with one or more logical entities are included in the MIB". It should be noted, however, that the list in this definition includes sensors and power supplies as being physical components, whereas the CIM model considers these to be logical devices associated with physical elements by a CIM_Realizes association. The physical entity table 96 describes the physical entities in an entityPhysical group managed by an agent (i.e. an identifiable physical resource within a managed system).

The entityLogical group can be represented in a logical entity table (or EntLogicalTable) 98 and can describe the logical entities managed by an agent. Section 2.1 of RFC2737 also includes a definition of a logical entity as follows: "A managed system contains one or more logical entities, each represented by at most one instantiation of each of a particular set of MIB objects. A set of management functions is associated with each logical entity include routers, bridges, print-servers, etc." The entityLogical group is therefore to be used for the representation of "high value" logical entities providing abstractions of service that are managed by higher levels of management. The logical entity table 98 can provide a named grouping of physical components and associated access information supporting multiple scoping.

The entityMapping group can be represented in an entity mapping table (or entContainsTable) 100 and can identify physical entity rows in the entPhysicalTable that a logical entity represented in the entLogicalTable depends upon. As will be described later, different physical to logical mappings can be provided in different embodiments. For example, in one example, a 1:n physical:logical mapping can be provided.

The entityGeneral group can be represented in a general entity table (or EntGeneralTable) 102 and can contain a time-stamp indicating when a MIB object in the above groups was last modified.

The entityMIBTraps group 94 can be represented in an entity traps table (or entMIBTraps) 104 that defines an entConfigChange notification which is used to signal any change to the MIB objects. This notification can be originated within the SNMP mediator rather than from the CIM model.

FIG. 16 illustrates the physical entity table 96 in more detail.

The physical entity table maps to an enumeration of all CIM_PhysicalElement instances with associated information from CIM_LogicalDevice instances with which the physical instance is associated. A Physical Entity Entry is a particular instance of a CIM_PhysicalElement or CIM_LogicalDevice class. The identity of the instance is specified by a Physical Entity Index object 106.

A Physical Entity Index object 106 is a mapping managed by an SNMP mediator (as implemented for example by computer executable code in the management console 365 illustrated in FIG. 10) from the SNMP integer index to the chosen concrete key properties, CreationClassName and Tag, of a CIM PhysicalElement subclass. Where there is a 1-1 CIM_Realizes association the SNMP mediator also maintains a mapping to the CIM_LogicalDevice key properties.

An entPhysicalContainedIn object 108 provides a mechanism for modeling containment. Containment in the physical entity table can be modeled according to different rules depending upon whether the object being modeled is part of a CIM_LogicalElement or a CIM_PhysicalElement hierarchies.

Containment in a CIM physical model can be described using a CIM_Container and/or CIM_PackageInSlot association hierarchy. These associations can contain two references: GroupComponent/Antecedent referring to the container and PartComponent/Dependent referring to the containee.

CIM_PackageInSlot can be employed for those items such as PCI Cards, Processor modules etc., which may be contained within the chassis, but for the purposes of the model are to be presented as "contained" within their respective slots. This can be used in preference to a CIM_Container relationship, and allows an entPhysicalClass rule for a module to be applied (see below). A CIM_PackageInConnector does not need to be covered because such relationships typically occur when the connector is less significant and the containment relationship is modeled using the CIM_Container relationship to a sub-assembly of some sort (e.g. a hard disk in a drive bay).

If there exists a CIM-PackageInSlot relationship such that the Dependent is this physical entity then an entPhysicalValue is set to that of the entPhysicalIndex corresponding to the key value of the Antecedent reference. Alternatively, if there exists a CIM_Container association whose Part Component reference is this physical entity then this object is mapped to the entPhysicalIndex corresponding to the key value of the GroupComponent reference.

CIM_LogicalDevice instances which are modeled in the physical entity table 96 can be modeled as being contained by an Antecedent in a CIM_Realizes relationship. In this case the entPhysicalContainedIn object can be mapped to the entPhysicalIndex of the Antecedent in the CIM_Realizes relationship. Otherwise the entPhysicalContainedIn object can be set to 0. This can be the case for the top-level container chassis components which is not physically contained within the scope of the model.

The syntax for the entPhysicalClass object 110 can be in the form of an enumeration taking one of the values indicated in the following Table 1, which indicates a correspondence between a row entPhysicalClass to CIM schema class. The mapping should produce one of these values depending on the outcome of tests listed under each value in Table 2, which represents the mapping of the entPhysical Class. Where a test is made against CreationClassName=CIM_xyz, it should also equate to true for all sub-classes of CIM_xyz except where specified.

TABLE 1

| PhysicalClass | CIM Class |
| --- | --- |
| Chassis(3) | CIM_Chassis |
| Container(5) | CIM_Slot or CIM_PhysicalFrame |
| PowerSupply(6) | CIM_PowerSupply |
| Fan(7) | CIM_PhysicalComponent |
| Sensor(8) | CIM_Sensor |
| Module(9) | CIM_PhysicalPackage |

TABLE 1-continued

| PhysicalClass | CIM Class |
|---|---|
| Port(10) | CIM_PhysicalConnector |
| Stack(11) | CIM_Rack |

TABLE 2

| PhysicalClass | Comment |
|---|---|
| Other(1) | This classification is applied for CIM_PhysicalElement instances which don't match more precisely against the following conditions. An entPhysicalTable entry with an entPhysicalClass of other(1) may be present if there is a specific sunPlatPhysicalClass which apples to it. |
| Unknown(2) | Not used. The class of a CIM object is always known. |
| Chassis(3) | Applied if CreationClassName == CIM_Chassis and module(9) is not applicable. |
| Backplane(4) | Not used, as the definition within the ENTITY-MIB is networking-specific. |
| Container(5) | Applied if CreationClassName == CIM_Slot. e.g. chassis slot or daughter-card holder Applied if CreationClassName == CIM_PhysicalFrame and it cannot be classified as chassis(3) or stack(11) e.g. Removable media bay |
| PowerSupply(6) | Power supply information may be modelled with a logical device in CIM. Thus this is applied if this logical entity is the Dependent in a CIM_Realizes association and has a CreationClassName of CIM_PowerSupply or CIM_Battery. |
| Fan(7) | Applied if there exists a CIM_Realizes association whose Antecedent reference is this physical entity and the Dependent reference has a CreationClassName of CIM_CoolingDevice. |
| Sensor(8) | Applied if this logical entity is a Dependent in a CIM_Realizes association and has a CreationClassName of CIM_Sensor. |
| Module(9) | Applied if this physical entity is a dependent in a CIM_PackageInSlot or CIM_CardInSlot relationship or if this physical entity is a PartComponent in a CIM_Container relationship where the antecedent has an entPhysicalClass of container(5). Or if this physical entity is a CIM_PhysicalPackage for which chassis(3) and stack(11) do not apply and it is not a PartComponent in a CIM_Container association. |
| Port(10) | Elements which would be classified as port(10) are classified as other(1). Elements which fall under this category are those for which: CreationClassName == CIM_PhysicalConnector And the element does not qualify as a container(5) and there exists a CIM_Realizes association whose antecedent reference is this physical entity and the Dependent reference has a CreationClassName of CIM_LogicalPort or CIM_NetworkAdapter. And the element is not an Antecedent or Dependent in a CIM_ConnectedTo or CIM_PackageInConnector relationship. And the antecedent in the CIM_ConnectorOnPackage association with this connector has a CreationClassName of CIM_Chassis |
| Stack(11) | Applied if CreationClassName == CIM_Rack. e.g. stack of multiple chassis entities |

The entity physical table can include other tables 112 as well as required. For example it can include a Physical Entity Description object that forms a direct mapping to a CIM_ManagedElement.Description. It can also include a Physical Entity VendorType, which is an object that is set for a chassis entities, otherwise it is null.

FIG. 17 illustrates an example of the entity logical table 98. As mentioned above, the entityLogical group can be used for the representation of "high level" logical entities providing service that can be managed by higher levels of management. Such management capabilities can include those that may be considered to be platform hardware management and may potentially include the following:

OS reboot—The capability to reboot the operating system

Hardware Reset—a facility to regain control of an otherwise unresponsive domain. This may be automated by an Automatic Server Restart (ASR) watchdog with explicit control.

Boot path control—a facility for controlling a boot path on booting the system.

Power control—the control of power state of the system

Firmware status—the facility to report the status of the firmware of the system

Naming scope management—the management of "naming scopes". A naming scope defines a subset of the information provided by the agent which may be accessed in a single management operation. Each naming scope may present several containment hierarchies within the physical entity table 93, each of which constitutes an administrative domain. Within each naming scope different administrative domains can be identified, which may each comprise part or all of a containment hierarchy. This can be achieved by representing each administrative domain by an entry in the entity logical table 98. These administrative domains may then be mapped to CIM_AdminDomain. The relationship between the administrative domain and its position in one or more entity physical table physical hierarchies may then be exposed by the entity mapping table 100.

FIG. 17 illustrates that the entity logical table 98 can include, for example, columns representing, respectively an index 114, a description 116, a type definition 118 and one or more columns of context information 120.

As has also been mentioned above, the entity mapping table 95 provides a mapping from the entityLogical to the entityPhysical groups. It is handled internally by the SNMP mediator, each mapping corresponding to an association between a CIM_LogicalElement modeled in the entity logical table 94 and a CIM-Physical Element instance.

A row appears in the logical entity table 98 only if at least one corresponding entity mapping table 100 entry is present. This ensures that entities modeled in the entLogicalTable are relevant to the platform(s) being managed.

The mapping between rows in the entity logical table 98 and the entity physical table 96 corresponds to a relationship between a CIM_LogicalElement and a CIM PhysicalElement.

Thus, the physical entity table 96 can represent, in CIM terms, a mix of physical and logical objects. Inventory information such as a serial number, for example, can be considered to be a physical attribute in the CIM model, whereas a firmware version number can be considered to be logical. The entPhysicalClass object in the physical entity able can classify the "hardware type of a particular physical entity", although many of the classifications are, from a CIM perspective, logical rather than physical. It will be appreciated from this that the definition of what is a physical and what is a logical entity can be different in different embodiments of the invention.

Optionally, the entityLogical group's logical entity table 98 can provide a named grouping of physical components and associated access information supporting multiple scoping. Support for an entity mapping group is not essential for all examples of the invention. Accordingly, the provision of an entity mapping table 100 is optional depending upon requirements. An entity mapping table 100 may, for example, be provided to support the representation of CIM_LogicalElement classes.

The physical entity table 94 provides information for both physical elements and logical devices, in particular, description and sub-classing information. The physical containment hierarchy of the CIM_Physical Elements modeled in the entityPhysical group can be mapped from CIM_Container and CIM_PackageInSlot associations. A CIM_Container association represents the relationship between a contained and a containing PhysicalElement. A CIM_PackageInSlot association models the capability of a chassis to allow for enhancement and/or augmentation of the base functionality by accepting additional chassis devices, similar to accepting functionality in the form of adding cards.

As mentioned above, the physical entity table 94 can be extended by the platform MIB, to add further, entity-specific, information. This again can provide a mix of physical and logical information. The mapping can resolves this using both CIM PhysicalElement and CIM LogicalDevice classes, and a CIM_Realizes association between them, where the CIM_Realizes association is an association that defines a mapping between a logical device and the physical component that implements the device. The indexing of a logical extension to a physical class (i.e. through using a common row in the MIBs) can be arranged, via the mapping, to represent the realizes association. This is illustrated schematically in FIGS. 19A and 19B to be described later.

It is possible that, in a CIM model, a single CIM_PhysicalElement may have a CIM Realizes relationship to many CIM LogicalDevices. As an entPhysicalclass is single-valued, the indexing of multiple logical extensions to a physical class (i.e. through using a common row in the MIBs) can be arranged, via the mapping, to represent the multiple realizes associations. This is illustrated schematically in FIGS. 20A and 20B to be described later.

Also, a CIM_Realizes association can be represented by modeling the Antecedent and Dependent in the association as separate rows in the physical entity table where the Antecedent contains the Dependent (i.e. the physical element contains the logical element). An example of this is illustrated schematically in FIGS. 21A and 21B to be described later.

Figure 21B:
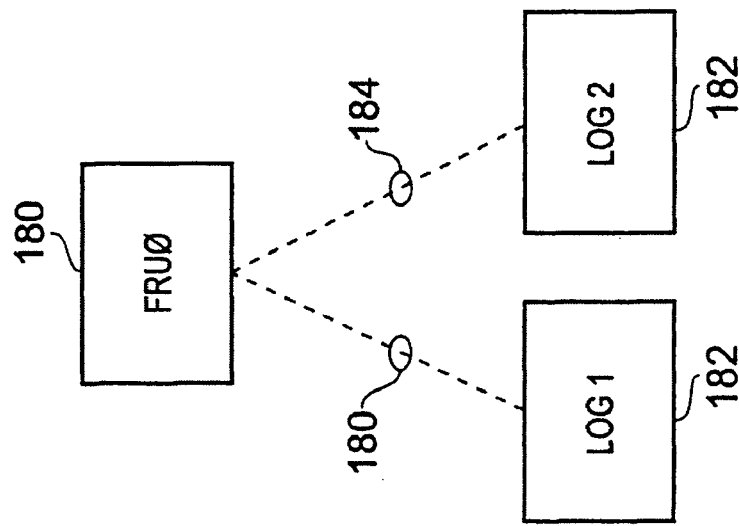
FIGS. 21A and 21B illustrate the representation of a 1:n physical to logical relationship.
Figure 21A:
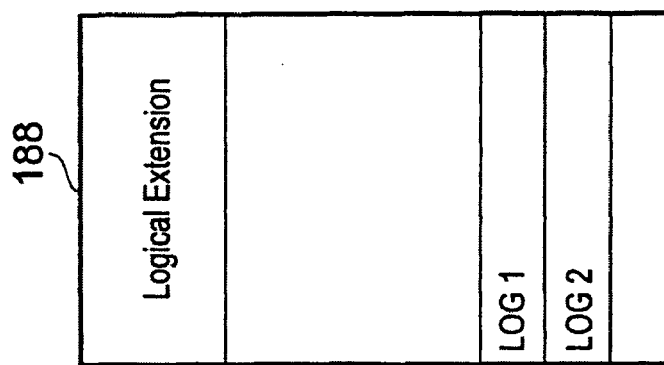

This modeling of a CIM_Realizes association by containment in the physical entity table (as represented in FIGS. 21A and 21B) can is performed, for example, for particular classes of CIM_LogicalDevice where they are unlikely to merit the instantiation of a separate CIM PhysicalElement. This could be the case, for example, for sensor devices (where the physical sensor is insignificant) and power supplies (where the physical element is likely to be classified as a module (9)—see FIG. 16).

In the case of a fan, for example, a CIM_PhysicalElement can be modeled in the physical entity table in order to provide the physical characteristics of the fan (e.g. part number etc.). This can have a CIM_Realizes relationship to a CIM_Fan (a logical device), which is not modeled separately. To indicate the presence of a table extension, the entPhysicalClass can be set to fan (7)—see FIG. 16. However, the same CIM_PhysicalElement can also have a CIM_Realizes association with a CIM_NumericSensor (the fan tachometer). In this case, the CIM_Realizes association can be indicated by creating a row in the physical entity table corresponding to a CIM_NumericSensor device with an entPhysicalClass of sensor.

Logical Elements are typically not modeled as separate rows in the physical entity table if they are not referenced in the Dependent property of a CIM_Realizes association, if they do not belong to a subclass of CIM_LogicalDevice for which an entPhysicalClass mapping applies.

Although one possible mapping for the representation of containment in the physical entity table is based on a CIM_Realizes association, other associations could be considered if this is not available for sensor and alarm devices.

For example containment could also be modeled using associations such as the CIM_PackageTempSensor and CIM_PackageAlarm relationships, and the CIM_AssociatedAlarm and CIM_AssociatedSensor relationships. The PackageTempSensor association describes a relationship where a temperature sensor is not arranged to measure any particular device, but rather a package's environment in general. Similarly, a PackageAlarm association describes a relationship where an alarm device is not intended to indicate issues with any particular LogicalDevice or PhysicalComponent, but rather with a package's environment in general. An AssociatedAlarm association describes a dependency where LogicalDevices have one or more AlarmDevices associated with them to indicate problem situations. A CIM_AssociatedSensor association describes a relationship where a device includes one or more sensors or has one or more sensors installed nearby, in order to measure critical input and output properties.

If such relationships are to be employed, account needs to be taken of the possibility of the sensor or alarm being remote from the thing which it alarms/senses, which could be problematical for alarms (especially visible alarms such as LEDs) as their physical location may be significant to users such as maintenance personnel. An alarm or sensor may also have CIM_AssociatedAlarm/Sensor relationships to multiple objects. Although CIM_Realizes may also be n:m, this is less likely, as alarms and sensors are generally single-point devices. For the above reasons, as well as for simplicity, a CIM_Realizes relationship is the preferred mapping for containment of logical devices in the SNMP mediator.

Physical elements can be modeled using CIM_PhysicalElement and CIM_LogicalDevice classes.

Turning now to FIG. 18, an example of a mapping for the mapping for the tables contained in the platform MIB 130 is illustrated. The platform MIB represents table extensions for the tables of the entity MIB 90. In the platform MIB 130, various extension tables are represented as will be described below. These extension tables can be grouped into tables representative of physical objects 132 and tables representative of logical objects 134.

As the number of possible subclasses that may be represented is quite large, in the present example the basis for choosing to represent a subclass of CIM_LogicalDevice by a table extension is as follows:

the object provides hardware status/environmental information, and the object is tied to a specific physical component/package (e.g. via a Realizes relationship, or another association as described above in the discussion with respect to sensors and alarms.)

In general, where there is a direct mapping from an enumerated set of integers in the CIM schemas to an enumerated set of integers in the MIB, the mapping of enumeration labels to values should be preserved save for them being uniformly incremented by 1 in order to start numbering from 1 rather than 0.

In Table 3 below, an example of a mapping of table extensions to CIM schema classes is represented. In table 6 below, an example of a mapping of entPhysicalClass and PlatPhysicalClass attributes is illustrated

TABLE 3

| Table Extension | Classes | EntPhysicalClass |
|---|---|---|
| PlatEquipmentTable | CIM_ManagedSystemElement | All |
| PlatCircuitPackTable | CIM_PhysicalPackage | module(9) |
| PlatPhysicalTable | Provides mapping from entPhysicalClass of 'other' to various Plat table extensions | other(1) |
| PlatFanTable | CIM_Fan | fan(7) |
| PlatSensorTable | CIM_Sensor | sensor(8) |
| PlatNumericSensorTable | CIM_NumericSensor | sensor(8) |
| PlatBinarySensorTable | CIM_BinarySensor | sensor(8) |
| PlatDiscreteSensorTable | CIM_DiscreteSensor | sensor(8) |
| PlatPowerSupplyTable | CIM_PowerSupply | PowerSupply(6) |
| PlatBatteryTable | CIM_Battery | PowerSupply(6) |
| PlatAlarmTable | CIM_AlarmDevice | other(1) |
| PlatWatchdogTable | CIM_Watchdog | other(1) | platform equipment table can include mappings of, for example, an administrative state, an operational state, an alarm status, an unknown status, a location name, and an alarm severity profile index. The platform equipment table thus forms an equipment table extension for the physical entity table to provide further information for managed objects of the GNIM Equipment class.

An entry in a platform physical table (PlatPhysicalTable) 138 is present if the managed object has an entPhysicalClass of other (1). The platform physical table forms a physical table extension that extends the physical entity table 96. It is used to supplement the entPhysicalClass column in the physical entity table. If a hardware resource has an entPhysicalClass of 'other', but is of a class modeled by the platform MIB, that is, the Watchdog or Alarm Device class, this table will identify its Platform class.

An entry in a platform equipment holder table (PlatEquipmentHolderTable) 140 is present where the managed object has an entPhysicalClass of container (5). The platform equipment holder table thus forms an equipment holder extension to augment the GNIM equipment table extension. It provides the additional information relevant for managed objects of the GNIM equipment holder class.

An entry in a platform circuit pack table (PlatCircuitPackTable) 142 is present where the managed object has entPhysicalClass of module (9). The platform circuit pack table thus forms a circuit pack table extension to augment

TABLE 4

| EntPhysical Class | Chassis | stack | container | Power Supply | Fan | | | sensor | | | Module | port | stack | other | |
|---|---|---|---|---|---|---|---|---|---|---|---|---|---|---|---|
| PlatPhysical Class Table | N/A | N/A | N/A | N/A | N/A | | | N/A | | | N/A | N/A | N/A | alarm | watch dog |
| Equipment-Table | X | X | X | X | X | | | X | | | X | X | X | X | X |
| Equipment-HolderTable | | | X | | | | | | | | | | | | |
| CircuitPack-Table | | | | | | | | | | | X | | | | |
| SensorClass | | | | | | | | Binary | nu-meric | dis-crete | | | | | |
| SensorTable | | | | | | | | X | X | X | | | | | |
| BinarySensor-Table | | | | | | | | X | | | | | | | |
| Numeric-SensorTable | | | | | | | | | X | | | | | | |
| DiscreteSensor-Table | | | | | | | | | | X | | | | | |
| WatchdogTable | | | | | | | | | | | | | | | X |
| AlarmTable | | | | | | | | | | | | | | X | |
| PowerSupply-Class | | | | Bat-tery | Power Supply | | | | | | | | | | |
| PowerSupply-Table | | | | X | X | | | | | | | | | | |
| BatteryTable | | | | X | | | | | | | | | | | |
| FanClass | | | | | Fan | Refrigera-tion | Heat Pipe | | | | | | | | |
| FanTable | | | | | X | X | X | | | | | | | | |

A first extension table is the platform equipment table (PlatEquipmentTable) 136. Each entry in the entPhysicalTable 96 has a corresponding entry in the platform equipment table 136. Accordingly, the OBJECT-TYPE definition for entries in this table contain an AUGMENTS clause. The the GNIM equipment table extension. It provides the additional information relevant for managed objects of the GNIM Circuit Pack class.

An entry in a platform sensor table (PlatSensorTable) 144 can be present if the entPhysicalClass for the row is set to sensor (8). The platform sensor table provides information relevant for managed objects of the Sensor class.

The mapping of CIM_Sensor subclasses can be performed as follows:

If the sensor realized by a CIM_PhysicalElement has CreationClassName=CIM_BinarySensor, the PlatSensorClass can be set to binary(1)

If the sensor has CreationClassName=CIM_NumericSensor, the PlatSensor can be set to numeric(2)

If the sensor has CreationClassName=CIM_DiscreteSensor, then if the number of entries in CIM_DiscreteSensor.PossibleValues is more than 2, then PlatSensorClass will be set to discrete(3), otherwise, PlatSensorClass will be set to binary(1).

If the sensor is not one of the above subclasses and is not a CIM_MultiStateSensor (see below), then if the number of entries in CIM_Sensor.PossibleStates is equal to 2, then the PlatSensorClass will be set to binary(1), otherwise, PlatSensorClass will be set to discrete(3).

In the CIM, a multi-state sensor is represented by an instance of class CIM_MultiStateSensor, which is associated with a number of individual sensors using the CIM_CollectionOfSensors association. Rather than modeling the multi-state sensor directly, the component sensors can be modeled. If these sensors are not Realized directly by a CIM_PhysicalElement, they can be considered for modeling purposes as being Realized by the same CIM_PhysicalElement that Realizes the CIM_MultiStateSensor.

A platform binary sensor table (PlatBinarySensorTable) 146 can provide a mapping for CIM binary sensor objects. The platform binary sensor table forms an extension that augments the platform sensor table 144. It provides additional information relevant for managed objects of the binary sensor class.

A platform numeric sensor table (PlatNumericSensorTable) 148 can provide a mapping for CIM numeric sensor objects. The platform numeric sensor table forms an extension that augments the platform sensor table. It provides additional information relevant for managed objects of the numeric sensor class.

A platform discrete sensor table (PlatDiscreteSensorTable) 150 can be provided, although in the present example this would only be populated where is not possible to represent a sensor using the PlatBinarySensorTable or the PlatNumericSensorTable.

A Platform discrete sensor state table (PlatDiscreteSensorStatesTable) 152 can be presented as an extension to the Platform discrete sensor table.

An entry in a platform fan table (PlatFanTable) 154 can be present where the entPhysicalClass for the row is set to fan (7). The platform fan table provides information relevant for managed objects of the fan class.

An entry in a platform alarm table (PlatAlarmTable) 156 can be present where the PlatPhysicalClass for the row is set to alarm (2). The platform alarm table provides information relevant for managed objects of the alarm class.

An entry in a platform watchdog table (PlatWatchdogTable) 158 can be present where the PlatPhysicalClass for the row is set to watchdog (3). The platform watchdog table provides information relevant for managed objects of the watchdog class.

An entry in a platform power supply table (PlatPowerSupplyTable) 160 can be present where the entPhysicalClass for the row is set to power supply (6).

An entry in a platform battery table (PlatBatteryTable) 162 can be present where the PlatPowerSupplyClass is set to battery (3).

The platform MIB 130 can also contain other tables.

A CIM logical hierarchy to entity logical table extensions mapping can be arranged such that entries in the entity logical table are relevant to the platform(s) being managed. Each of the rows in the entity logical table is arranged to have a corresponding row in a platform logical table extension 164.

The platform logical class of the entity logical table can be mapped as illustrated in Table 5 below

TABLE 5

| PlatLogicalClass | Mapping |
| --- | --- |
| Other(1) | This applies if none of the mappings below apply. |
| ComputerSystem(2) | The CIM managed object that this entLogicalTable row represents has a CreationClassName of CIM_UnitaryComputerSystem or one of its subclasses. |
| AdminDomain(3) | The CIM managed object that this entLogicalTable row represents has a CreationClassName of CIM_AdminDomain or one of its subclasses. |

An entry can appear in a platform unitary computer system table (PlatUnitaryComputerSystemTable) 166 where the PlatLogicalClass indicates this table for that row.

A platform initial load information table (PlatInitialLoadInfoTable) 168 can be configured as an extension of the platform unitary computer system table to present current boot options, as well as a current set of desired boot options.

A platform start time table (PlatStartTime) 170 can report the time at which the agent was last started. This can be maintained internally by the SNMP mediator and does not require a mapping to the CIM Schemas.

The platform MIB can also include a Platform MIB Traps group (not shown). The platform MIB can also include other tables (not shown)

SNMP indexes can be used to identify rows of an SNMP table. They may be single or multi-dimensional indexes. In the present example, the 'conceptual' mapping of SNMP tables is as follows:

table entry definitions correspond to object model classes;

table columns correspond to properties of the object model class; and table rows correspond to instances of the object model class.

SNMP table extensions (tables sharing the same index objects as another 'base' table) may be viewed as mapping to either:

sub-classing the object module class represented in the 'base' table by the addition of properties; or providing an association between an object module instance represented in the 'base' table and an object module instance represented in the extension.

A table row is identified in SNMP by a table index appended to a columnar object's OID. The columnar object's OID is a dot separated sequence of index values, most simply '.n', but potentially of the form '.a.b.c' etc. for multi-dimensional tables. Each index value may be a simple integer or alternatively a string of fixed or variable length. These tables, and hence their indexes, may be sparsely populated.

The entity-MIB may only use simple integer indexes, although the Platform MIB can use more complex indexes including, for example, SNMP OIDs and IP addresses.

In CIM, an object instance is identified by its object path. The object path encodes a namespace in which the objects class is defined, a class type of the object and an object key property. A key is a property or set of properties used uniquely to identify an instance of a class (key properties are marked with the KEY qualifier).

Identity in CIM is achieved by combining all the properties of an object that have a Key qualifier. This is potentially rather complicated for a logical device object that has "propagated" keys. Such "target" classes' "propagated" keys can be sourced from another class with which the class is associated. This association (of which there may only be one per instance) qualifies the "target" class as having a weak reference.

For example, CIM_Logical Device instances can be associated with a CIM_System instance by a CIM_SystemDevice association of the type"

class CIM_SystemDevice: CIM_SystemComponent {
    [Override ("GroupComponent"), Aggregate, Max (1), Min (1), Description {"The parent system in the Association."})]
    CIM_System REF GroupComponent;
        [Override {"Part Component"), Weak, Description ("The LogicalDevice that is a component of a System.")]
    CIM_LogicalDevice REF Part Component; };

This association states that there must be one, and only one, CIM_System associated with any given CIM LogicalDevice instance. It also qualifies the reference to the CIM_System as being Weak. Thus, the following key property declaration from CIM_LogicalDevice declares a SystemName key property that is sourced from the Name property of the associated CIM_System instance.

[Propagated("CIM_System.Name"),
    Key, MaxLen (256),
    Description ("The scoping System's Name.")] string SystemName;

An SNMP mediator can be operable to create a dynamic correspondence between SNMP table indexes and CIM object paths. As mentioned above, an SNMP mediator is a software component that is responsible for mapping between, in the present example, a CIM_based model and SNMP MIBs. The mapping specification is arranged to use object paths when object identity is required. The assignment of SNMP table indexes to object paths is unspecified—however once assigned they remains immutable only whilst a CIM object manager (CIM OM) is running.

The mapping from object instances represented by SNMP rows to CIM objects may be 1—1, or alternatively may be n—n. Thus a given SNMP table entry may be sourced from a number of CIM objects, and likewise, a given CIM object may impact multiple SNMP objects.

Accordingly, there has been described a table-based solution to the representation of instances of classes within a defined class inheritance hierarchy using SNMP tables.

Although a particular embodiment of the invention has been described, it will be appreciated that many modifications and additions are possible within the spirit and scope of the invention. Accordingly, the particularly described embodiment is not intended to be limiting, but merely provides an example of a possible implementation.

An agent can be implemented in the form of a software component that can be provided as a program product on a carrier medium. The carrier medium could be a storage medium such as an optical, magneto optical or magnetic disk, a tape, a solid state memory, or indeed any other form of storage medium. It could also be a transmission medium such as a telephone wire, a wireless communication medium such as a radio or microwave transmission medium, or indeed any other form of transmission medium.

Similarly, the management controller could be implemented as software and could be supplied on a carrier medium wherein the carrier medium can be any carrier medium as described above. Alternatively, the management controller could be implemented by means of microcode or special purpose logic and implemented in a device such as, for example, an application specific integrated circuit (ASIC).

The management controller can be operable to display a representation of associations between physical and logical entities on a display device associated with a management station (e.g., a management console 365 as illustrated in FIG. 10) on which the management controller is implemented.

Also, in the present example, the storage of the data structure including the plural tables is held in the device to be managed and is accessed directly by the management controller when information regarding the resources in the device to be managed is required. However, as an alternative, those tables could be held outside the device to be managed, or could be copied, for example, at regular intervals, to the management controller, or to an alternative location separate from the managed device and the management controller. Such an example may be desirable where a reliable link to the managed device is not possible and/or characteristics thereof are likely to change at infrequent intervals.

The MIB extension tables can be spread across a number of MIBs to accommodate the classes required. Thus, an existing class, represented using one or more MIBs may be sub-classed by the addition of a further MIB to provide the table extension definitions for the sub-classes' additional attributes.

There has been described a mechanism whereby managed physical objects can be represented as entries in tables. A table extension mechanism as described, for example, in co-pending U.S. application Ser. No. 09/796,931 mentioned earlier, can be employed to handle sub-classing handle for representing a 1-1 or 1-n association between such an object and one or more managed logical objects using further table extensions.

FIGS. 19A and 19B provide a schematic representation of an approach to providing a 1:1 realizes association between a logical entity and a physical entity that realizes it. As shown in FIG. 19A, a logical table extension 188 (or a plurality thereof) in the logical part 134 of the Platform MIB 130 can represent a logical object (LOG1). The same index clause (e.g., 5) can be used as the physical object (e.g., FRU 0) that realizes it (i.e. the logical object and the physical object can be represented on the same row, whereby the mapping of the logical and physical objects represents the realizes association 186. FIG. 19B illustrates the 1:1 realizes association 184 between the corresponding logical entity (LOG1) 182 and the physical entity (FRU 0) 180 that realizes it. Thus for a given logical or physical entities, its counterpart in the realization association may be referenced and/or accessed using the same index identifier.

Figure 20A:
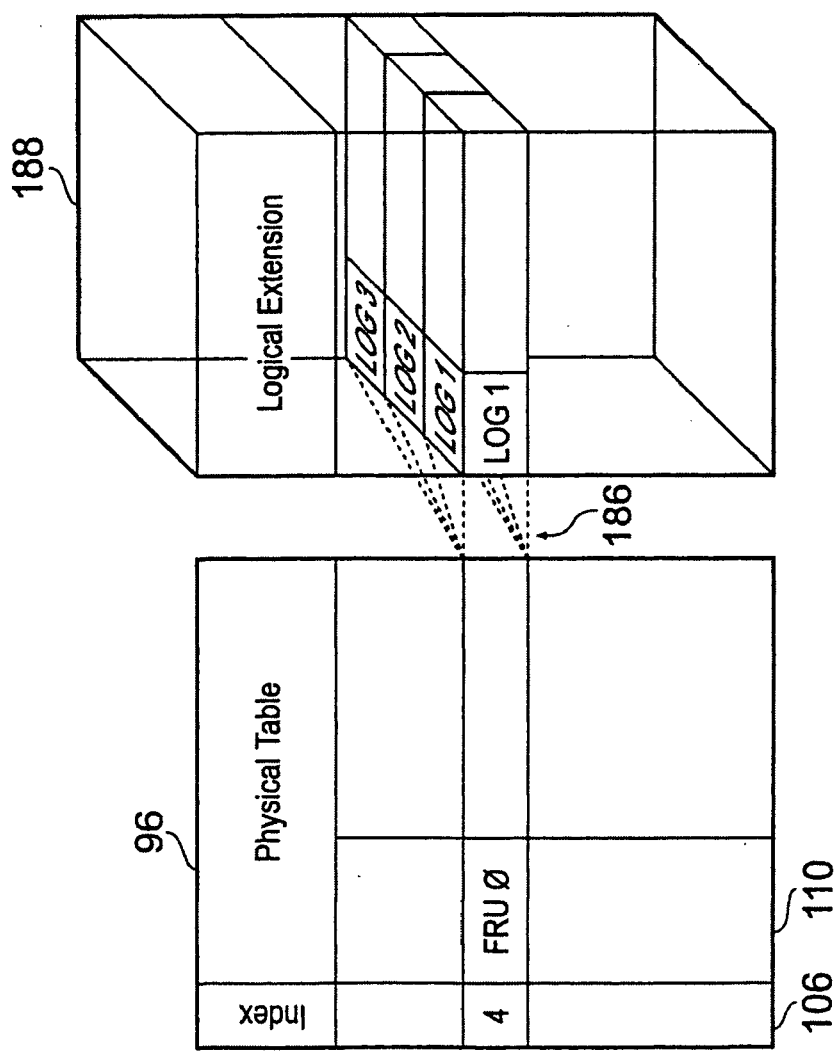
FIGS. 20A and 20B illustrate the representation of a 1:n physical to logical relationship.
Figure 20B:
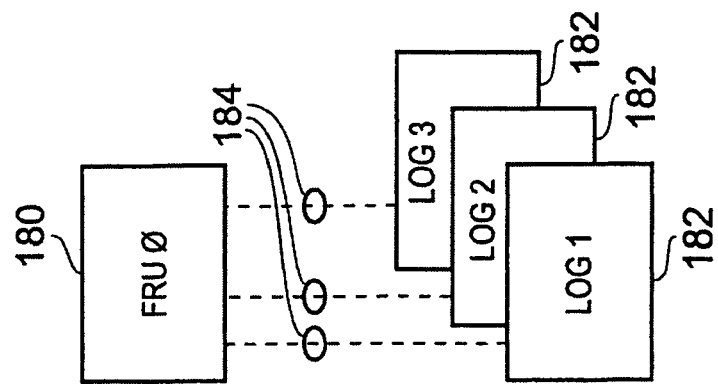

FIGS. 20A and 20B provide a schematic representation of an approach to providing a n:1 realizes association between a plurality of logical entities and a physical entity that realizes them. As shown in FIG. 20A, a plurality of logical table extensions 188 in the logical part 134 of the Platform MIB 130 can represent respective logical objects (LOG1, LOG2, LOG3, etc) that shares a same table base index (e.g., 4) as the physical object (FRU0) that realizes them 186. To identify each respective logical object, a supplemental index can be employed in the INDEX clause For example, LOG1, LOG, LO3, etc can be accessed by an appended index entry (4.1, 4.2, 4.3, etc). This additional entry accomodates the "n" in the "n:1" relationship. For a given logical object table entry, its physical counterpart may be found using the index less the additional entry, whereas for a given physical object table entry, its logical counterparts can be found using a getNEXT operation starting from the index with a ".0" appended. FIG. 20 illustrates the n:1 realizes association 184 between the logical entities (LOG1 and LOG2) 182 and the physical entity (FRU 0) 180 that realizes them.

FIGS. 21A and 21B provide a schematic representation of an approach to providing a n:n realizes association between a number of one or more logical entities and a number of one or more physical entities that realize them. An n-n association may be represented through establishing a base index corresponding to the association and then providing independent index suffixes for each party in the association. For example, as shown in FIG. 21A, logical objects LOG1 and LOG2 represented by logical extension table 188 are realized by FRU0 as represented by containment through ContainedIn references at 108 to the index 3 of the FRU0. FIG. 20 illustrates the n:n realizes association 184 between the logical entities (LOG1 and LOG2) 182 and the physical entity (FRU 0) 180 that realizes them.

Thus, there has been described a computer-implemented mechanism for representing system management information for components of a system as instances of managed object classes. A plurality of tables are provided with at least one table including instance entries for instances of physical object classes representing physical entities. Attribute entries for attributes of the physical object classes are mapped to instance entries in the tables. The allocation of attributes to attribute entries can be effected so as to mirror a class inheritance hierarchy. Also, attributes of logical object classes representing logical entities are mapped to the tables to represent associations between the physical object classes and the logical object classes.

Respective instances of a physical object class can be mapped to respective rows in a first table. An instance of at least one logical object class can be mapped to a row of an extension table that corresponds to the row in the first table to which an instance of the physical object class with which it is associated is mapped. A row to which an instance of the physical object class is mapped in the first table can be accessible using an index value, whereby the instance of the physical object class and the instance of the logical object class associated therewith can be accessible via the same index value. For example, the instance of the physical object class can be accessible using the index value and the instance of the logical object class associated therewith can be accessible using the same index value plus an additional index component, for example an index suffix.

Associations between a single physical entity and a plurality of logical entities can be represented, for example, by mapping instances of a plurality of logical object classes representing respective ones of the logical entities to respective ones of a plurality of extension tables. Each of the instances of the plurality of logical object classes can be mapped to a row in the respective extension table that corresponds to the row in the first table to which the instance of the physical object class with which they are associated is mapped. A row to which an instance of the physical object class is mapped in the first table can be accessible using an index value, and the instance of each logical object class associated therewith can accessible using the same index value plus a respective additional index component, for example an index suffix.

Thus, a base index can identify a physical object class, and respective index suffixes identify parties to an association with the physical object class. The association can be one in which a physical entity realizes a logical entity.

There has also been described a computer-implemented method of representing management information for components of a system as instances of managed object classes in a plurality of tables, wherein at least one table includes instance entries for instances of physical object classes representing physical entities. The method includes mapping attribute entries for attributes of the physical object classes to the instance entries, where the allocation of attributes to attribute entries can be effected so as to mirror a class inheritance hierarchy. The method also includes mapping attributes of logical object classes representing logical entities to the tables to represent associations between the physical object classes and the logical object classes.

The method can include mapping respective instances of a physical object class to respective rows in a first table and mapping an instance of at least one logical object class to a row of an extension table that corresponds to the row in the first table to which an instance of the physical object class with which it is associated is mapped.

The method can also include accessing a row to which an instance of the physical object class is mapped in the first table using an index value, and accessing an instance of the logical object class associated therewith using an index value based on that used to access the instance of the physical object class.

The method can also include representing associations between a single physical entity and a plurality of logical entities by mapping instances of a plurality of logical object classes representing respective ones of the logical entities to respective ones of a plurality of extension tables, each of the instances of a plurality of logical object classes being mapped to a row in the respective extension table that corresponds to the row in the first table to which the instance of the physical object class with which they are associated is mapped.

The method can include accessing a row to which an instance of the physical object class is mapped in the first table using an index value, and to access the instance of each logical object class associated therewith using the same index value plus a respective additional index component.

The described method and mechanism can be implemented by means of a computer program operable on, for example, a management computer system. Representations of associations between physical and logical entities can be displayed on, for example, a display of the management computer system.

As mentioned above, however, although this mechanism has been described in the context of a realizes association, it may similarly be applied to other associations, typically primary associations.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A computer-readable storage medium comprising program instructions, wherein the program instructions are executable to:

allocate a plurality of tables to store system management information for components of a system as instances of managed object classes, wherein the plurality of tables include a first table and at least one extension table, wherein the first table includes instance entries for instances of physical object classes representing physical entities;

map attribute entries for attributes of the physical object classes to the instance entries, wherein the allocation of attributes to attribute entries being effected so as to mirror a class inheritance hierarchy; and map attributes of logical object classes representing logical entities to the at least one extension table to represent associations between the physical object classes and the logical object classes.

2. The computer-readable storage medium of claim 1, wherein the program instructions are executable to map respective instances of a physical object class to respective rows in the first table.

3. The computer-readable storage medium of claim 2, wherein the program instructions are executable to map an instance of at least one logical object class to a row of the extension table that corresponds to the row in the first table to which an instance of the physical object class with which it is associated is mapped.

4. The computer-readable storage medium of claim 3, wherein a row to which an instance of the physical object class is mapped in the first table is accessible using an index value, whereby the instance of the physical object class and the instance of the logical object class associated therewith are accessible via the same index value.

5. The computer-readable storage medium of claim 4, wherein the instance of the physical object class is accessible using the index value and wherein the instance of the logical object class associated therewith is accessible using the same index value plus an additional index component.

6. The computer-readable storage medium of claim 3, wherein the program instructions are executable to represent associations between a single physical entity and a plurality of logical entities by mapping instances of a plurality of logical object classes representing respective ones of the logical entities to respective ones of a plurality of extension tables, wherein each of the instances of the plurality of logical object classes being mapped to a row in the respective extension table that corresponds to the row in the first table to which the instance of the physical object class with which they are associated is mapped.

7. The computer-readable storage medium of claim 6, wherein a row to which an instance of the physical object class is mapped in the first table is accessible using an index value, and the instance of each logical object class associated therewith is accessible using the same index value plus a respective additional index component.

8. The computer computer-readable storage medium of claim 7, wherein the additional index component is an index suffix.

9. The computer computer-readable storage medium of claim 6, wherein a base index identifies a physical object class, and respective index suffixes identify parties to an association with the physical object class.

10. The computer computer-readable storage medium of claim 6, wherein the association is an association in which a physical entity realizes a logical entity.

11. The computer computer-readable storage medium of claim 6, wherein the the first table is an entity MIB table.

12. The computer computer-readable storage medium of claim 11, wherein the plurality of tables comprise at least one entity MIB table and a plurality of extension tables.

13. The computer computer-readable storage medium of claim 6, wherein the program instructions are executable to display a representation of associations between physical and logical entities.

14. A system comprising:

a processor; and memory coupled to the processor, wherein the memory stores program instructions executable by the processor to:

allocate a plurality of tables to store system management information for components of a system as instances of managed object classes, wherein the plurality of tables include a first table and at least one extension table, wherein the first table includes instance entries for instances of physical object classes representing physical entities;

map attribute entries for attributes of the physical object classes to the instance entries, wherein the allocation of attributes to attribute entries being effected so as to mirror a class inheritance hierarchy; and map attributes of logical object classes representing logical entities to the at least one extension table to represent associations between the physical object classes and the logical object classes.

15. The system of claim 14, wherein the program instructions are executable to map respective instances of a physical object class to respective rows in the first table and to map an instance of at least one logical object class to a row of extension table that corresponds to the row in the first table to which an instance of the physical object class with which it is associated is mapped.

16. The system of claim 15, wherein the program instructions are executable to access a row to which an instance of the physical object class is mapped in the first table using an index value, and to access an instance of the logical object class associated therewith using an index value based on that used to access the instance of the physical object class.

17. The system of claim 15, wherein the program instructions are executable to represent associations between a single physical entity and a plurality of logical entities by mapping instances of a plurality of logical object classes representing respective ones of the logical entities to respective ones of a plurality of extension tables, each of the instances of the plurality of logical object classes being mapped to a row in the respective extension table that corresponds to the row in the first table to which the instance of the physical object class which they are associated is mapped.

18. The system of claim 17, wherein the program instructions are executable to access a row to which an instance of the physical object class is mapped in the first table using an index value, and to access the instance of each logical object class associated therewith using the same index value plus a respective additional index component.

19. The computer program system of claim 18, wherein the additional index component is an index suffix.

20. The system of claim 17, wherein the association is an association in which a physical entity realizes a logical entity.

21. The computer program system of claim 17, wherein the program instructions are executable to display a representation of associations between physical and logical entities.

22. A computer-implemented method comprising:
allocating a plurality of tables to store system management information for components of a system as instances of managed object classes, wherein the plurality of tables include a first table and at least one extension table.
wherein the first table includes instance entries for instances of physical object classes representing physical entities;
mapping attribute entries for attributes of the physical object classes to the instance entries, wherein the allocation of attributes to attribute entries being effected so as to mirror a class inheritance hierarchy; and
mapping attributes of logical object classes representing logical entities to the at least one extension table to represent associations between the physical object classes and the logical object classes.

23. The computer-implemented method of claim 22, comprising mapping respective instances of a physical object class to respective rows in the first table and mapping an instance of at least one logical object class to a row of the extension table that corresponds to the row in the first table to which an instance of the physical object class with which it is associated is mapped.

24. The computer-implemented method of claim 23, comprising accessing a row to which an instance of the physical object class is mapped in the first table using an index value, and accessing an instance of the logical object class associated therewith using an index value based on that used to access the instance of the physical object class.

25. The computer-implemented method of claim 23, comprising representing associations between a single physical entity and a plurality of logical entities by mapping instances of a plurality of logical object classes representing respective ones of the logical entities to respective ones of a plurality of extension tables, each of the instances of the plurality of logical object classes being mapped to a row in the respective extension table that corresponds to the row in the first table to which the instance of the physical object class with which they are associated is mapped.

26. The computer-implemented method of claim 25, comprising accessing a row to which an instance of the physical object class is mapped in the first table using an index value, and to access the instance of each logical object class associated therewith using the same index value plus a respective additional index component.

27. The computer-implemented method of claim 26, wherein the additional index component is an index suffix.

28. The computer-implemented method of claim 25, wherein the association is an association in which a physical entity realizes a logical entity.

29. The computer-implemented method of claim 25, comprising displaying a representation of associations between physical and logical entities.

* * * * *

UNITED STATES PATENT AND TRADEMARK OFFICE
CERTIFICATE OF CORRECTION

| | | |
|---|---|---|
| PATENT NO. | : 7,213,026 B2 | Page 1 of 1 |
| APPLICATION NO. | : 10/354458 | |
| DATED | : May 1, 2007 | |
| INVENTOR(S) | : Evans et al. | |

It is certified that error appears in the above-identified patent and that said Letters Patent is hereby corrected as shown below:

Column 39

Lines 55, 58, 62, 65, please delete the first instance of "computer".

Column 40

Lines 1 and 4, please delete the first instance of "computer".

Signed and Sealed this

Thirty-first Day of July, 2007

JON W. DUDAS
*Director of the United States Patent and Trademark Office*